(12) United States Patent
Fotak et al.

(10) Patent No.: US 12,021,713 B2
(45) Date of Patent: Jun. 25, 2024

(54) ANOMALY DETECTION

(71) Applicant: Geotab Inc., Oakville (CA)

(72) Inventors: Meghan Frances Fotak, Mississauga (CA); Samantha Anne Waring, Burlington (CA); Ivan Li, Richmond Hill (CA); Jialin Zhu, Toronto (CA)

(73) Assignee: Geotab Inc., Oakville (CA)

( * ) Notice: Subject to any disclaimer, the term of this patent is extended or adjusted under 35 U.S.C. 154(b) by 91 days.

(21) Appl. No.: 17/973,074

(22) Filed: Oct. 25, 2022

(65) Prior Publication Data
US 2023/0049099 A1 Feb. 16, 2023

Related U.S. Application Data

(63) Continuation of application No. 17/381,645, filed on Jul. 21, 2021, now abandoned.

(60) Provisional application No. 63/130,071, filed on Dec. 23, 2020.

(51) Int. Cl.
| | |
|---|---|
| *G06F 11/00* | (2006.01) |
| *G06F 18/214* | (2023.01) |
| *G06F 18/2321* | (2023.01) |
| *G07C 5/08* | (2006.01) |
| *H04L 43/04* | (2022.01) |
| *H04L 43/067* | (2022.01) |
| *H04L 43/0817* | (2022.01) |

(52) U.S. Cl.
CPC ......... *H04L 43/067* (2013.01); *G06F 18/214* (2023.01); *G06F 18/2321* (2023.01); *G07C 5/0808* (2013.01); *G07C 5/0816* (2013.01); *H04L 43/04* (2013.01); *H04L 43/0817* (2013.01)

(58) Field of Classification Search
CPC . G07C 5/0808; G07C 5/0816; G06F 11/2263; G06F 11/2257
See application file for complete search history.

(56) References Cited

U.S. PATENT DOCUMENTS

| | | | |
|---|---|---|---|
| 5,659,593 A | * | 8/1997 | Tzvieli ................ H04M 3/36 |
| | | | 379/112.01 |
| 9,418,339 B1 | | 8/2016 | Leonard et al. |
| 10,255,085 B1 | | 4/2019 | Valsaraj et al. |
| 11,831,527 B2 | | 11/2023 | Valente et al. |
| 2009/0144122 A1 | | 6/2009 | Ginsberg et al. |
| 2014/0337971 A1 | | 11/2014 | Casassa Mont et al. |
| 2016/0275399 A1 | | 9/2016 | Leonard et al. |
| 2016/0371170 A1 | | 12/2016 | Salunke et al. |

(Continued)

OTHER PUBLICATIONS

Bergman L., et al., "Classification-Based Anomaly Detection for General Data," Arxiv.org, Cornell University Library, 201 Olin Library Cornell University Ithaca, NY 14853, May 5, 2020, 12 Pages, XP081659888.

(Continued)

*Primary Examiner* — Philip Guyton
(74) *Attorney, Agent, or Firm* — Lawrence Xin-Tao Yu

(57) ABSTRACT

Disclosed is a computing platform including a memory assembly having encoded thereon executable control-logic instructions configured to be executable by the computing platform, and also configured to urge the computing platform to carry out a method comprising receiving data; and detecting at least one anomaly contained in the data that was received.

18 Claims, 10 Drawing Sheets

(56) References Cited

U.S. PATENT DOCUMENTS

| | | |
|---|---|---|
| 2017/0249648 A1 | 8/2017 | Garvey et al. |
| 2018/0046926 A1 | 2/2018 | Achin et al. |
| 2018/0100784 A1 | 4/2018 | Patil et al. |
| 2018/0324199 A1 | 11/2018 | Crotinger et al. |
| 2019/0102276 A1 | 4/2019 | Dang et al. |
| 2019/0286995 A1 | 9/2019 | Robinson et al. |
| 2019/0379589 A1 | 12/2019 | Ryan et al. |
| 2020/0097810 A1 | 3/2020 | Hetherington et al. |
| 2020/0250066 A1 | 8/2020 | Dang et al. |
| 2020/0265494 A1 | 8/2020 | Glaser et al. |
| 2020/0372298 A1* | 11/2020 | Challis .................. G06F 11/302 |
| 2020/0387797 A1 | 12/2020 | Ryan et al. |
| 2021/0004704 A1 | 1/2021 | Dang et al. |
| 2021/0125053 A1* | 4/2021 | Faibish .................. G06N 3/045 |
| 2021/0390455 A1 | 12/2021 | Schierz et al. |
| 2022/0197890 A1* | 6/2022 | Fotak ...................... G06F 17/18 |
| 2022/0198305 A1* | 6/2022 | Fotak ....................... G06N 7/01 |
| 2022/0200878 A1* | 6/2022 | Fotak ...................... G06N 20/00 |
| 2023/0049099 A1* | 2/2023 | Fotak ................... G06F 18/214 |

OTHER PUBLICATIONS

Extended European Search Report for European Application No. 21217075.7, mailed May 16, 2022, 9 Pages.
Extended European Search Report for European Application No. 21217127.6, mailed May 16, 2022, 10 Pages.
Extended European Search Report for European Application No. 21217255.5, mailed May 16, 2022, 10 Pages.
Mihaita A-S., et al., "Traffic Congestion Anomaly Detection and Prediction Using Deep Learning," Cornell University Library, 201 Olin Library Cornell University Ithaca, NY 14853, Jun. 23, 2020, pp. 1-25, XP081708784.

* cited by examiner

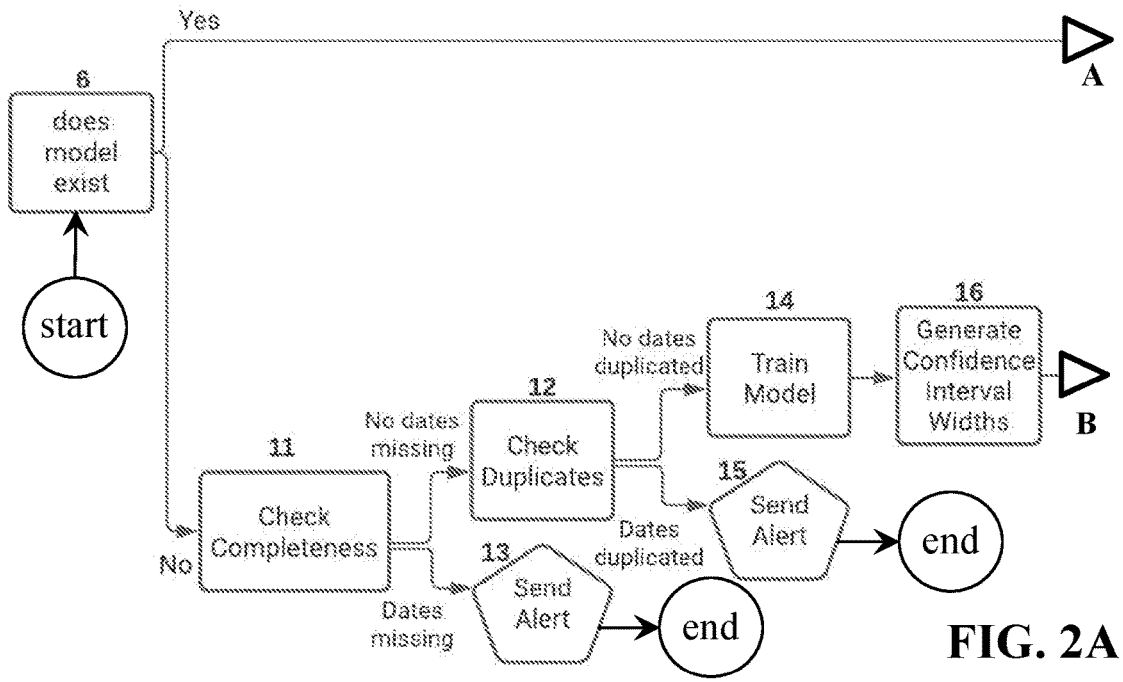
FIG. 2A
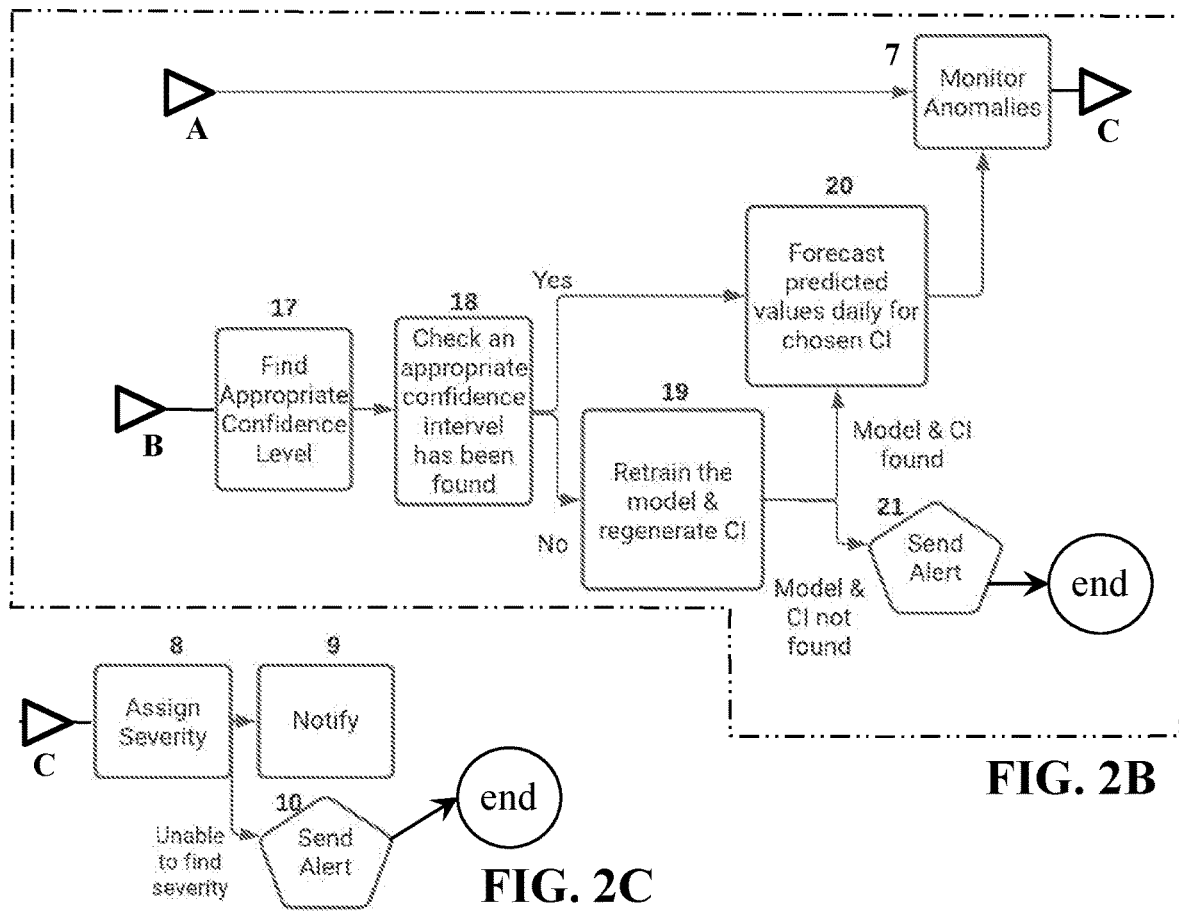
FIG. 2B
FIG. 2C

ANOMALY DETECTION

CROSS-REFERENCE TO RELATED PATENT APPLICATION(S)

This application is a continuation of U.S. patent application Ser. No. 17/381,645 filed Jul. 21, 2021 and titled "ANOMALY DETECTION", which claims priority to U.S. Provisional Application No. 63/130,071 filed Dec. 23, 2020 titled "ANOMALY DETECTION", the contents of which are incorporated herein by reference for all purposes.

TECHNICAL FIELD

This document relates to the technical field of (and is not limited to) a computing platform configured to detect at least one anomaly contained in data (and method thereof), etc.

BACKGROUND

In data analysis, anomaly detection (also outlier detection) is the identification of rare items, events, or observations that raise suspicions by differing significantly from the majority of the data. The anomalous items might translate to some kind of problem (a business problem). Anomalies may be referred to as outliers, novelties, noise, deviations, and exceptions.

SUMMARY

It will be appreciated that there exists a need to mitigate (at least in part) at least one problem associated with the existing computing platforms configured to detect at least one anomaly (also called the existing technology). After much study of, and experimentation with, the existing computing platforms configured to detect at least one anomaly, an understanding (at least in part) of the problem and its solution have been identified (at least in part) and are articulated (at least in part) as follows:

Known sensors and/or systems are configured to (constantly) emit (transmit) a relentless stream of time-series data, which is recorded (digitally recorded) and accumulated by a server. To detect an anomaly contained in the vast quantity of time-series data requires a substantial amount of time and inconvenience. Known methods for detecting an anomaly (contained in the vast quantity of time-series data) may include using (executing) a static rule-based approach (also called static rule implement control logic). Unfortunately, the static rule implement detection logic (of a static rule system) is configured to detect a specific, predetermined outcome, or set of characteristics, for the anomaly to be detected in the data. Using known methods can be expensive for operating computing platforms over prolonged periods of time in the detection of an anomaly (contained in the vast quantity of time-series data), in terms of electrical power consumption associated with powering the computing platforms (for prolonged periods of time), increased costs associated with labor, etc.

Unfortunately, the static rule system is configured to deploy (use) logic that does not automatically evolve (or learn) on its own, and therefore requires human input to maintain (and adjust) the control logic, and to further customize the static rule system over time (requiring increased labor costs, etc.).

What may be needed is at least one method (computer-implemented method) configured to detect an anomaly contained in a vast quantity of time-series data that requires (substantially) less time and/or is more convenient (to use), in comparison to known methods. What may be needed is at least one method (computer-implemented method) configured to automatically evolve (or learn), and therefore may require substantially less human input to maintain (adjust), and/or fewer customization changes over time, etc.

To mitigate, at least in part, at least one problem associated with the existing technology, there is provided (in accordance with a first major aspect) a computing platform including a memory assembly having encoded thereon executable control-logic instructions configured to be executable by the computing platform, and also configured to urge the computing platform to carry out a method comprising: receiving data; and detecting at least one anomaly contained in the data that was received. The unexpected improvement is provided for in the above embodiment is a reduced processing time compared to known methods. The improvement is a relatively faster processing time realized for the detection of an anomaly contained in the data (a volume of data, such as a vast quantity of data to be accumulated over a prolonged period of time, time-series data).

To mitigate, at least in part, at least one problem associated with the existing technology, there is provided (in accordance with a second major aspect) a computing platform including a memory assembly having encoded thereon executable control-logic instructions configured to be executable by the computing platform, and also configured to urge the computing platform to carry out a method comprising: determining whether there is an existing statistical model to be selected or whether a new statistical model is to be created. The unexpected improvement provided, by the above embodiment, includes reduced processing time compared to known methods. The improvement is a relatively faster processing time realized for the detection of an anomaly contained in the data (a volume of data, such as a vast quantity of data to be accumulated over a prolonged period of time, time-series data).

To mitigate, at least in part, at least one problem associated with the existing technology, there is provided (in accordance with a third major aspect) a method configured to be carried out by a computing platform including a memory assembly having encoded thereon executable control-logic instructions configured to be executable by the computing platform, and also configured to urge the computing platform to carry out the method comprising: determining whether there is an existing statistical model to be selected or whether a new statistical model is to be created. The unexpected improvement (provided by the above embodiment) includes reduced processing time compared to known methods. The improvement is a relatively faster processing time realized for the detection of an anomaly contained in the data (a volume of data, such as a vast quantity of data to be accumulated over a prolonged period of time, time-series data).

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in a simplified form that are further described below in the Detailed Description. This Summary is not intended to identify potential key features or possible essential features of the disclosed subject matter and is not intended to describe each disclosed embodiment or every implementation of the disclosed subject matter. Many other novel advantages, features, and relationships will become apparent as this description proceeds. The figures and the description that follow more particularly exemplify illustrative embodiments.

According to an embodiment there is provided a computing platform, comprising, a processor, and a memory assembly being configured to be in signal communication with the processor, and the memory assembly having encoded thereon executable control-logic instructions being configured to be executable by the processor, and the executable control-logic instructions also being configured to urge the processor to carry out a method comprising, receiving data, and detecting at least one anomaly contained in the data that was received. In an embodiment the computing platform is configured for receiving data wherein the data includes time-series data.

In an embodiment the computing platform is further configured for identifying, selecting, and training a statistical model, without any additional user input. In an embodiment the computing platform is configured identifying, selecting, and training a statistical model, without any additional user input wherein the statistical model includes a statistical algorithm configured to learn patterns in the data without relying on hard-coded rules for learning the patterns.

In an embodiment the computing platform is further configured for altering input parameters, without user input, in an attempt to find, select and train an alternate model, where the statistical model is not identified, selected, or trained. In an embodiment the computing platform is further configured for evaluating performance of the statistical model by comparing predicted values and actual values of data. In an embodiment the computing platform is further configured for evaluating performance by comparing the predicted values and the actual values of data. In an embodiment the computing platform is further configured for using a level of uncertainty, for the statistical model, to generate a confidence interval for a prediction used for determining whether an actual value in the data is, or is not, an anomaly.

In an embodiment the computing platform is further configured for determining a level of confidence by utilizing a dynamic process for selecting a level of uncertainty based on volatility in the data within a training time window. In an embodiment the computing platform is further configured for detecting anomalies in training data, in which the training data includes historical data. In an embodiment the computing platform is further configured for assisting selection of said training data. In an embodiment the computing platform is further configured for, detecting data anomalies in volumes of data, and generating a model, and determining confidence levels, and using the statistical model to forecast volumes of the data. In an embodiment the computing platform is further configured for detecting anomalies in training data wherein, the training data includes actual volumes of data extending over a training period, and the actual volume of data, which has been received, extends during a selected time span, and the method further includes, determining a confidence interval, and determining whether or not the actual volume of data is within the confidence interval.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 2A, FIG. 2B, and FIG. 2C (SHEET 2 of 8 SHEETS) depict schematic views, in accordance with a first embodiment, of a logic-control flow diagram for a framework process (a framework method) for use with the training data 1 of FIG. 1.

Figure 1:
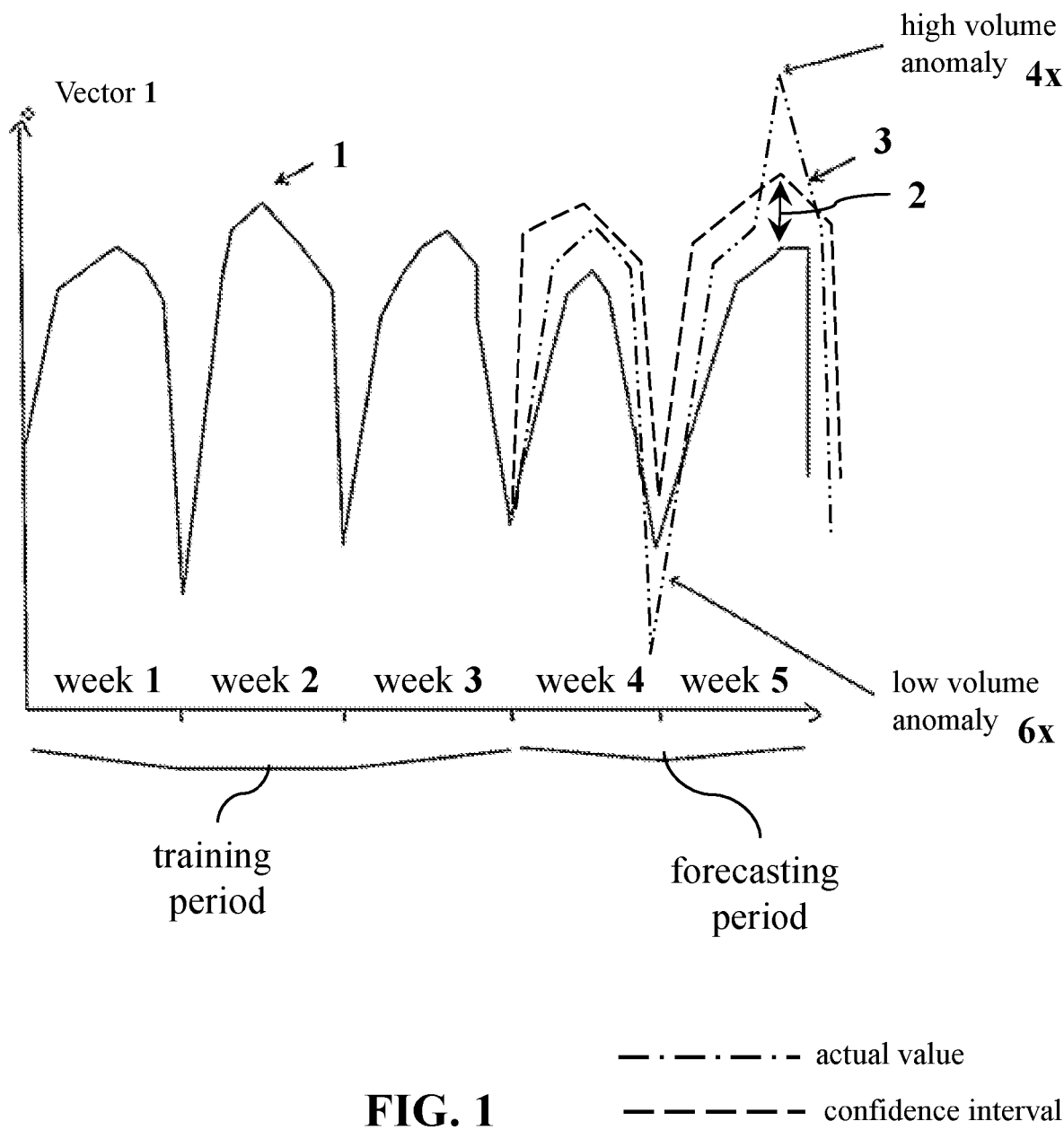
FIG. 1 (SHEET 1 of 8 SHEETS) depicts a schematic view of training data 1.

The drawings are not necessarily to scale and may be illustrated by phantom lines, diagrammatic representations, and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

| LISTING OF REFERENCE NUMERALS USED IN THE DRAWINGS | |
|---|---|
| training data 1 | BLOCK 12 |
| confidence interval 2 | BLOCK 13 |
| data 3 | BLOCK 14 |
| high volume anomaly 4x | BLOCK 15 |
| low volume anomaly 6x | BLOCK 16 |
| BLOCK 6 | BLOCK 17 |
| BLOCK 6a | BLOCK 18 |
| BLOCK 6b | BLOCK 18a |
| BLOCK 6c | BLOCK 18b |

-continued

LISTING OF REFERENCE NUMERALS
USED IN THE DRAWINGS

| | |
|---|---|
| BLOCK 7 | BLOCK 18c |
| BLOCK 8 | BLOCK 19 |
| BLOCK 9 | BLOCK 20 |
| BLOCK 10 | BLOCK 21 |
| BLOCK 11 | BLOCK 22 |

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the disclosure is defined by the claims. For the description, the terms "upper," "lower," "left," "rear," "right," "front," "vertical," "horizontal," and derivatives thereof shall relate to the examples as oriented in the drawings. There is no intention to be bound (limited) by any expressed or implied theory in the preceding Technical Field, Background, Summary, or the following detailed description. It is also to be understood that the devices and processes illustrated in the attached drawings, and described in the following specification, are exemplary embodiments (examples), aspects, and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments, and any equivalent thereof) are described regarding the drawings. It should be understood that the disclosure is limited to the subject matter provided by the claims and that the disclosure is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

A computing platform (known to persons skilled in the art, and not depicted) is the environment in which a piece of software is executed. The computing platform may be called a digital platform. The computing platform may be the hardware or the operating system (OS), a web browser and its associated application programming interfaces, or other underlying software, as long as the program code is executed with the computing platform. Computing platforms have different abstraction levels, including computer architecture, an operating system, or runtime libraries. The computing platform is the stage on which computer programs can run (be executed).

A framework (known to persons skilled in the art, and not depicted) is a platform for developing software applications. The framework may be called a software framework. The framework provides a foundation on which software developers may build programs for a platform (also called a specific computing platform). The computing platform is the hardware (computer) and software (operating system) on which software applications may be run (executed), and is the foundation upon which any software application is supported and/or developed. Computers use specific central processing units (CPUs) that are designed to run specific machine language code. In order for the computer to run a software application, the software application must be written in the binary-coded machine language of the CPU. The software application written for one computing platform would not work (run or operate) on a different computing platform.

For example, the software framework may include predefined classes and functions that may be used to process inputs, manage hardware devices, interact with system software, etc. This arrangement streamlines the development process since programmers do not need to reinvent the wheel each time they develop a new application. The software framework includes software providing generic functionality that may be selectively changed by additional user-written code, thus providing application-specific software. The software framework provides a standard way to build and deploy applications and is a universal, reusable software environment that provides particular functionality as part of a larger software platform to facilitate the development of software applications. The designers of the software framework aim to facilitate software developments by allowing designers and programmers to devote their time to meeting software requirements rather than dealing with the more standard low-level details of providing a working system, thereby reducing overall development time. For example, a team using a web framework to develop a banking website can focus on writing code particular to banking rather than the mechanics of request handling and state management (details pertaining to computing hardware). Software frameworks may include, for instance, support programs, compilers, code libraries, toolsets, and application programming interfaces (APIs) that bring together all the different components to enable the development of a system (software system).

The software framework (also called a software framework process, method, etc.) includes computer control-logic code configured to (A) receive (read) data (a collection of data); and (B) detect abnormal values (detect at least one anomaly) contained in (positioned in or associated with) the data. A specific and non-limiting example of the data includes time-series data (also called, historical data). Time-series data is a collection of observations (recorded measurements) obtained through repeated measurements over time. The time-series data (the collection of data) includes (preferably) pairs of data coordinates (also called data points or data pairs). Each data point includes a datum value and a corresponding time value (such as the time that the datum value was obtained or measured). The data point may be expressed as (data value, time value). The time-series data (the data points) may be plotted on a graph, with one of the axes (on the horizontal axis) of the graph labeled as time. The vertical axis of the graph is labeled as a magnitude of the datum value, etc. It will be appreciated that sensors and/or systems are configured to (constantly) emit (transmit) a (relentless) stream of time-series data, which is recorded (digitally recorded and stored in a server, etc.). A server is a piece of computer hardware or computer software (computer program) that provides functionality for other programs or devices, called clients. Servers may provide various functionalities (often called services), such as sharing data and/or resources among multiple clients, performing computation for a client, etc. For instance, time-series data may be useful for tracking: (A) daily, hourly, or weekly weather data; and (B) changes in application performance; and (C) changes in (for visualizing changes in) medical vitals (preferably, in real-time or near real-time) as provided by a medical device; and (D) tracking computer network logs (records), etc. The time-series data may include any type of time-sequenced data obtained over a time interval (preferably, a consistent time interval), such as an hourly interval, a daily interval, etc., or any equivalent thereof.

The framework includes computer control-logic code further configured to identify (find), select, and train a model without any (additional) user input. The model includes (is) a statistical algorithm configured to learn patterns in the data (the collection of data). This is done, preferably, without relying on hard-coded rules for learning the patterns. The framework includes computer control-logic code further configured to alter input parameters (preferably, without user input) in an attempt to find, select and train an alternate model (a new model), for the case where the model (an appropriate model) is not found (is not identified, selected, or trained). For the case where the framework is not able to identify, select or train the model (an appropriate model), the framework process may be stopped, and then a static rule-based approach (also called a static rule implement control logic) may be considered as an alternative approach (as an alternative to the framework process). The static rule implement detection logic (of a static rule system) is configured to detect a specific, predetermined outcome or set of characteristics (for the data to be analyzed). Unfortunately, the static rule system pertains to a system configured to deploy logic that does not automatically evolve (or learn) on its own, and therefore requires human input to maintain (and adjust) the control logic, and to further customize the static rule system over time. It may be very advantageous to implement a system (such as the framework process) that automatically evolves (or learns) on its own, and therefore requires significantly less (preferably, no) human input to maintain (and adjust) and/or further customize (over time).

The model (also called a statistical model) includes, preferably, any type of statistical model configured to forecast predicted values (that is, predicted into the future). The statistical model is a mathematical model that embodies a set of statistical assumptions concerning the generation of sample data (and similar data from a larger population of data). The statistical model may be specified as a mathematical relationship between one or more random variables and other non-random variables, etc. A preferred embodiment of the model includes an Auto-Regressive Integrated Moving Average model (the ARIMA model), and any equivalent thereof. The ARIMA model is a generalization of an autoregressive moving average model (the ARMA model). The ARIMA model and/or the ARMA model are fitted to time-series data either to better understand the data and/or to predict future points in the series (forecasting). When the seasonality shows in the time-series data, the seasonal-differencing may be applied to eliminate the seasonal component. The ARIMA model is a time-series model that is configured to (A) learn seasonality and/or complex time-related behavior in data, and (B) predict future values (based on the learning that was determined), thereby accounting for historical time-related behavior. Other specific and non-limiting examples of models may include a linear regression approach, a simple rule-based approach (such as a moving average), etc., and any equivalent thereof. The framework may be configured to process (work with, use) the data that has a degree of uncertainty. For the case where the data of interest does not have variability (i.e. the data values do not deviate, or are too stable), there may be nothing to predict, and the framework process may not be applicable, and another suitable approach may be deployed.

The model may be configured to predict, as closely as possible (preferably within a degree of acceptable tolerance), future values of data. The framework process includes computer control-logic code further configured to evaluate the performance of the model (performance is preferably done by comparing the predicted values and the actual values of data). The framework process (method) includes computer control-logic code further configured to utilize the model in a different manner. In accordance with a preferred embodiment, the framework process does not use the model to predict values (into the future). The framework process includes computer control-logic code further configured to use a level of uncertainty, for the model (for a given model) to generate (create) a confidence interval for a prediction used for determining whether an actual value (the measured value) in the data is (or is not) an anomaly. A confidence interval is configured to indicate how well a parameter of interest was determined (such as a mean or regression coefficient). An anomaly is an artifact that deviates from what is expected.

The framework process includes computer control-logic code further configured to determine a level of confidence by utilizing a dynamic process for selecting a level of uncertainty based on volatility in the data within a training time window. Volatility is an indication of the liability to change rapidly and unpredictably (especially for the worse). The framework includes computer control-logic code further configured to (preferably) determine (compute) that about 95 percent confidence level is appropriate (acceptable). In other words, it is with about 95 percent confidence that the interval will (likely, statistically) contain the true value (the actual value or measured value). Actual values that fall outside of the confidence interval are likely due to events that the model has not seen, and the actual values are, therefore, anomalous (the actual value deviates from what is expected).

The framework includes computer control-logic code further configured to (preferably) detect anomalies in the training data including the historical data. For instance, the historical data includes (comprises) data of interest collected over a period of time. The training data may be selected by (a user of) the framework. The framework includes computer control-logic code further configured to (preferably) assist the user to select the training data.

The framework includes computer control-logic code further configured to (preferably) select the training data (to assist the user to make the selection, preferably based on a business context). The business context encompasses an understanding of the factors impacting a company (a business) from various perspectives, such as how decisions are made and what the company is ultimately trying to achieve, etc. The business context may be used to identify key implications for the execution of the strategic initiatives of the business. In a specific and non-limiting example, the user may select six months of training data (which may be based on a business cycle of the company). Some problems may include: (A) the user, initially, selecting six months of training data, which might provide a model with poor detection of granular trends; and/or (B) the user, subsequently, selecting less than six months of training data, which may provide a model that focuses attention on granular trends and not on learning global trends.

The framework includes computer control-logic code further configured to (preferably) detect data anomalies in volumes of data (to be received by a server, known to persons of skill in the art and not depicted). The framework includes computer control-logic code further configured to (preferably) assist the user to select a predetermined time span (such as three weeks of training data is selected, by the user). The framework includes computer control-logic code further configured to (preferably): (A) generate a model, (B) determine the confidence levels, and (C) use the model to forecast volumes of data (to be received by the server, such as over the next two weeks, etc.).

FIG. 1 depicts a schematic view of training data 1.

Referring to the embodiment as depicted in FIG. 1, the training data 1 includes (preferably) actual volumes of data (historical data received by a server) extending over (during) a training period (such as a three-week training period, etc.). The actual volume of data 3 (that is received by the server) extends during (into) week 4 and week 5 (that is, during a selected time span in which actual data is received). The framework includes computer control-logic code further configured to determine (compute) a confidence interval 2 (also described in connection with BLOCK 16, as depicted in FIG. 2). The framework includes computer control-logic code further configured to determine whether or not the actual volume of data 3 is within the confidence interval 2. For instance, the control-logic code may further make (identify) a determination that the actual volume of data 3 is not within the confidence interval 2 at the following example instances: (A) an instance 4 (a high volume anomaly 4x), for the case where a relatively higher volume of data is received, during a selected time span (where the actual volume of data on a given day is determined to be above the confidence interval 2); and/or (B) an instance (a low volume anomaly 6x), for the case where a relatively lower volume of data is received, during a selected time span (where the actual volume of data on a given day is determined to be below the confidence interval 2).

FIG. 2A, FIG. 2B, and FIG. 2C depict schematic views, in accordance with a first embodiment, of a logic-control flow diagram for a framework process (a framework method) for use with the training data 1 of FIG. 1.

Referring to the embodiment as depicted in FIG. 2, there is depicted a high-level logic (control flow) diagram of a process (method) configured to detect data anomalies. In general terms, the framework includes computer control-logic code further configured to detect data anomalies in a volume of data, in which the volumes of data are to be stored in a memory assembly (known and not depicted) of a computing platform (known and not depicted). The data is to be, preferably, received by a server, which is known to persons of skill in the art, and not depicted. The framework includes computer control-logic code further configured to train a new statistical model (such as for each Sunday) to be utilized during a predefined time period (such as the remainder of the week). The framework includes computer control-logic code further configured to train the new model by selecting a confidence level for discerning anomalous values from normal values. The framework includes computer control-logic code further configured to monitor (such as for each day during a week) the forecasted volume versus the actual volume of data (to be, preferably, received by the server). The framework includes computer control-logic code further configured to (A) abandon (from time to time, such as, for each Sunday) the new model (that was trained), and (B) train a new model (that is, the new model is, in effect, a replacement model that is used to replace an existing model or prior calculated model.

Referring to the embodiment as depicted in FIG. 2A, a memory assembly (known to persons skilled in the art, and not depicted) is configured to receive and tangibly store an executable program. The executable program includes the computer control-logic code (coded instructions, programmed coded instructions) of the software framework process configured to be readable by, and executable by, a computing platform (known by persons skilled in the art, and not depicted). The executable program is configured to urge the computing platform to perform predetermined computing-platform operations, as described herein. Equivalents to the executable program include (and are not limited to): (A) machine-language code, (B) assembly-language code, (C) source code formed in a high-level computing language understood by humans (the high-level language of the source code is compiled into either an executable machine code file or a non-executable machine-code object file), (D) an application-specific integrated circuit and any equivalent thereof, and/or (E) a field-programmable gate array (FPGA) and any equivalent thereof, and/or in any combination and permutation thereof. It will be appreciated that the software framework process is configured to urge the computing platform to execute computing operations (functions, calculations, comparisons, etc.). The computing hardware and other operating components of the computing platform are utilized and are suitable for performing the computer control-logic code of the software framework process and are not intended to limit the applicable environments. A person skilled in the art will immediately appreciate that the embodiments may be practiced with other computing-platform configurations, including set-top boxes, hand-held devices, multiprocessor systems, microprocessor-based or programmable consumer electronics, network computers, minicomputers, mainframe computers, set-top boxes, hand-held devices, multiprocessor systems, microprocessor-based or programmable consumer electronics, network computers, minicomputers, mainframe computers, and the like. The computing platform may include, for instance, a processing unit (such as a processor assembly, known and not depicted), which may include a microprocessor such as the INTEL (TRADEMARK) PENTIUM (TRADEMARK) microprocessor or the MOTOROLA (TRADEMARK) POWER PC (TRADEMARK) microprocessor. One of skill in the art will immediately recognize that the term memory assembly (also called a computer-readable medium or a machine-readable medium, etc.) may include any type of storage device that is accessible by the computing platform. The memory assembly may be embodied on a magnetic hard disk or an optical disk having executable instructions to cause the computing platform to perform the computer control-logic code of the software framework process. Computer hardware (operating components and any equivalents thereof) suitable for performing the processes of the embodiments are not intended to limit the applicable environments.

It will be appreciated that in accordance with a preferred embodiment, there is provided a computing platform (known and not depicted) including a memory assembly (known and not depicted) having encoded thereon executable control-logic instructions (which are similar and/or equivalent to the computer control-logic code of the software platform) configured to be executable by the computing platform, and also configured to urge the computing platform to carry out a method. It will be appreciated that in accordance with another preferred embodiment, there is provided the computing platform including a processor (known and not depicted), and the memory assembly (also called a non-transitory computer-readable storage medium) including executable control-logic instructions (computer-executable instructions) that are executable by the processor in such a way that the processor is urged to perform a method. It will be appreciated that in accordance with another preferred embodiment, there is provided the non-transitory computer-readable medium including computer-executable instructions that, when executed by a processor of a computing platform, causes the processor to perform a method. It will be appreciated that in accordance with another preferred embodiment, there is provided a method (also called a computer-implemented method) that, when executed by a processor of a computing platform, causes the processor to perform a method. Alternatively, the framework includes computer control-logic code further configured to (A) abandon the present model, and (B) train a new model (such as before the date of next Sunday). Exemplary reasons for abandoning the present model, and training the new model (prior to a given day, such as Sunday) may include: (A) a user may suspect the training data (used to train the present model) was bad (not acceptable), (B) the user may wish to train a new model with new data, or may wish to train a new model for other reasons, (C) there may have occurred a networking error, and/or (D) there may have occurred other types of errors (such as hardware errors, network appliance errors, among others, etc.).

Referring to the embodiment as depicted in FIG. 2, the framework includes a collection of interconnected BLOCKS. The framework (software framework, framework process) is configured to develop a software application that is executable on a computing platform (known to persons skilled in the art, and not depicted). Each BLOCK of the framework has or includes computer control-logic code (which may include at least one or more machine-learning algorithms) configured to direct operations of the computing platform.

Block 6

Referring to the embodiment as depicted in FIG. 2, the framework includes BLOCK 6 having computer control-logic code configured to perform machine learning tasks. Machine learning is the use and/or the development of computer systems that are configured to learn and adapt without following explicit instructions, by using algorithms and statistical models to analyze and draw inferences from patterns in (identified in) data (a collection of data). Machine learning (a part of artificial intelligence) is the study of computer algorithms configured to improve automatically through experience and by the use of data. Machine-learning algorithms build a model based on sample data, known as "training data", in order to make predictions or decisions without being explicitly programmed to do so. Machine-learning algorithms are used in a wide variety of applications, such as in medicine, e-mail filtering, computer-vision processing (etc.), where it is difficult or unfeasible to develop conventional algorithms to perform the needed (computer-processing) tasks. A subset of machine learning is closely related to computational statistics, which focuses on making predictions using computers; but not all machine learning is statistical learning. The study of mathematical optimization delivers methods, and theory, and application domains to the field of machine learning. Data mining is a related field of study, focused on exploratory data analysis through unsupervised learning. In its application across business problems, machine learning is also referred to as predictive analytics.

Referring to the embodiment as depicted in FIG. 2, the framework includes BLOCK 6.

BLOCK 6 includes computer control-logic code configured to determine whether there is an existing model (existing statistical model) to be selected or whether a new model (new statistical model) is to be created. Starting at BLOCK 6, the framework process is configured to determine whether a new model is to be created (formed). For example, a new model is to be created for the case where any one of the following conditions may be TRUE: [condition 1] the current day is Sunday; or [condition 2] a model does not exist (for example, a model was not trained on the preceding Sunday); or [condition 3] the user wishes to train a new model. If any one of [condition 1] to [condition 3] is TRUE, the framework process is configured to create a new model, and the framework process proceeds to BLOCK 11 (CHECK COMPLETENESS). Otherwise, the framework process is configured to (A) not create a new model, and/or (B) select an existing model; then, the framework process proceeds to BLOCK 7.

Block 7

Referring to the embodiment as depicted in FIG. 2, the framework includes BLOCK 7. BLOCK 7 includes computer control-logic code configured to monitor anomalies. BLOCK 7 includes computer control-logic code configured to (for the case where the existing statistical model is identified and selected) process a volume of data having time-series data, monitor the volume of data, and detect whether there is at least one anomaly in the a volume of data by determining whether an actual value falls outside of a confidence interval to be generated. BLOCK 7 includes computer control-logic code configured to process the volume of data (the volume of data has time-series data), and monitor the volume of data) for detecting at least one anomaly therein. BLOCK 7 includes computer control-logic code to process a volume of data having time-series data, monitor the volume of data, and detect whether there is at least one anomaly in the volume of data. Detecting whether said at least one anomaly was detected includes, preferably, determining whether an actual value falls outside of a confidence interval. Control is transferred from BLOCK 7 to BLOCK 8, for the case where said at least one anomaly was detected, (e.g., an actual value falls outside of the confidence interval).

Block 8 (Assigning Severity Process)

Referring to the embodiment as depicted in FIG. 2, the framework includes BLOCK 8. BLOCK 8 includes computer control-logic code configured to (A) label (identify) the anomaly that was detected, for the case where said at least one anomaly was detected (as determined in BLOCK 7); and (B) assign a severity level for the anomaly that was labeled (identified). BLOCK 8 includes computer control-logic code further configured to generate an anomaly status for the anomaly that was detected (such as either HIGH, NORMAL, or LOW) by comparing (A) the actual volume of data received against (B) the confidence intervals that were generated. BLOCK 8 includes computer control-logic code further configured to mark the anomaly status for a predefined time period (such as the anomaly status of a day or 24 hour time period, etc.) as NORMAL, for the case where the actual volume of data is within the confidence interval (that is, within the upper bound (upper limit) of the confidence interval and the lower bound (lower limit) of the confidence interval). BLOCK 8 includes computer control-logic code further configured to mark the anomaly status, for a predefined time period spanning the time-series data, as NORMAL, for the case where the actual volume of data is within the confidence interval during the predefined time period. BLOCK 8 includes computer control-logic code configured to mark the anomaly status (the day's anomaly status) as HIGH, for the case where the actual volume of data is above the upper bound (upper limit) of the confidence interval. BLOCK 8 includes computer control-logic code configured to mark the anomaly status, for a predefined time period spanning the time-series data, as HIGH, for the case where the actual volume of data is above the upper bound (upper limit) of the confidence interval during the predefined time period. BLOCK 8 includes computer control-logic code configured to mark the anomaly status (the day's anomaly status) as LOW, for the case where the actual volume of data is below a lower bound (lower limit) of the confidence interval. BLOCK 8 includes computer control-logic code configured to mark the anomaly status, for the predefined time period spanning the time-series data, as LOW, for the case where the actual volume of data is below the lower bound (lower limit) of the confidence interval during the predefined time period.

Referring to the embodiment as depicted in FIG. 2, BLOCK 8 includes computer control-logic code configured to determine a severity status (degree of severity) of the anomaly (that was detected or identified), for the case where the anomaly status of a day is marked HIGH or LOW. BLOCK 8 includes computer control-logic code configured to determine a severity status of the anomaly that was detected, for the case where the anomaly status, for the predefined time period spanning the time-series data, is marked HIGH or LOW. The determination of the severity status of the anomaly, to be executed by BLOCK 8, may include a HOLIDAY CHECK process and a SEVERITY CHECK process (described below). BLOCK 8 may further include computer control-logic code configured to take at least one or more actions dependent on the severity status (severity level) of the anomaly (that was detected or identified).

Block 8 Holiday Check Process

Referring to the embodiment as depicted in FIG. 2, BLOCK 8 includes computer control-logic code configured to execute the HOLIDAY CHECK process, which may influence actions (to be performed or executed by the framework, etc.), for the case where the anomaly status (for a selected day) is marked either HIGH or LOW. For example, the HOLIDAY CHECK process may include computer control-logic code configured to (A) utilize an internal database of historical dates of holidays, (B) check (see, determine) whether a holiday occurred (for a particular jurisdiction, such as in Canada or the USA) within a time window (such as a three-day window, preferably from the execution date). For example, data may be expected to behave abnormally on holidays (such as less data might be expected on Christmas day, etc.). BLOCK 8 includes computer control-logic code configured to not generate a notification of an anomaly, for the case where the anomaly status for a selected holiday is marked LOW. BLOCK 8 includes computer control-logic code configured to generate a notification of an anomaly, for the case where the anomaly status of a day is marked LOW on a day other than a holiday.

Block 8 Severity Check Process

Referring to the embodiment as depicted in FIG. 2, BLOCK 8 includes computer control-logic code configured to include a SEVERITY CHECK process to be executed (performed), for the case where (when) the anomaly status (of a day) is marked HIGH or LOW (i.e. the volume falls outside of the confidence intervals). The SEVERITY CHECK process may include having computer control-logic code configured to (A) determine a change (a percent change) between the volume of data received and the median thereof; (B) calculate the percent change from recent normal values (such as the five most recent normal values for that day of the week); and (C) use the change (the percent change) to classify a severity score (such as MINOR, MODERATE, SERIOUS or SEVERE). The thresholds of percent changes for classifying the severity score as MINOR, MODERATE, or SEVERE may be specified by the user. For example, the user may specify thresholds based on a use-case, such as a particular business problem. Control is transferred from BLOCK 8 to BLOCK 9, for the case where a severity (severity level) was determined (identified) in BLOCK 8. Control is transferred from BLOCK 8 to BLOCK 10, for the case where the severity (severity level) was NOT determined (identified) in BLOCK 8.

Block 9

Referring to the embodiment as depicted in FIG. 2, BLOCK 9 includes computer control-logic code configured to perform actions that may be executed (taken) when an anomaly occurs and may depend on the severity level that was determined for the anomaly status (of a date), such as by the HOLIDAY CHECK process and the severity score (identified by the SEVERITY CHECK process). BLOCK 9 includes computer control-logic code configured to transmit (send) a notification (such as an e-mail notification, to a server-support email address, etc.), in which the e-mail notification is configured to indicate that an anomaly was detected (such as a low-level anomaly for the case where the severity level is LOW). BLOCK 9 includes computer control-logic code configured to transmit (send) the notification (such as an automated message, a telephone call with a pre-recorded message, a text message having a preprogrammed, predetermined message or recording, etc.). The notification is configured to indicate: (A) an anomaly was detected, and (B) (immediate) user-action is required. For instance, the automated message may be issued for the case where a high-level anomaly was detected, in which the severity level is HIGH. The automated message may be sent to an on-call server-support user (person), etc.

Block 10

Referring to the embodiment as depicted in FIG. 2, BLOCK 10 includes computer control-logic code configured to perform (execute) actions, for the case where an anomaly occurs. The actions to be performed may depend on the severity level that was determined for the anomaly status (of a date), such as by the HOLIDAY CHECK process and the severity score (identified by the SEVERITY CHECK process). BLOCK 10 includes computer control-logic code configured to transmit (send) an alert (an e-mail alert, etc.), for the case where the severity level cannot be calculated or determined (such as for the case where five abnormal values were detected within the past eight weeks). For this case, the user may investigate to determine the cause of (for) the abnormal data occurring within the past eight weeks.

Block 11

Referring to the embodiment as depicted in FIG. 2, control is transferred from BLOCK 6 to BLOCK 11. BLOCK 11 includes computer control-logic code configured to check the completeness of the data (the volume of data having time-series data), by determining whether the training data includes the volume of data (preferably, that was received for each day over the past six months, thereby determining whether there is missing data). Control is transferred from BLOCK 11 to BLOCK 12 (for the case where there is NO missing data for any specific date; that is, the data is complete). Control is transferred from BLOCK 11 to BLOCK 13 (for the case where there is missing data for at least one date; that is, the data is incomplete).

Block 12

Referring to the embodiment as depicted in FIG. 2, control is transferred from BLOCK 11 to BLOCK 12. BLOCK 12 includes computer control-logic code configured to check for (identify) duplicates (duplicated data between dates). BLOCK 12 includes computer control-logic code configured to determine whether any training data is duplicated (e.g., there is no duplicated date). Control is transferred from BLOCK 12 to BLOCK 15, for the case where the training data is determined to be duplicated.

Block 13

Referring to the embodiment as depicted in FIG. 2, control is transferred from BLOCK 11 to BLOCK 13, for the case where the training data is determined to be incomplete (in BLOCK 11). This condition may indicate a larger system failure and may cause (result in) failure of a time-series model. BLOCK 13 includes computer control-logic code configured to send (transmit) an alert for the case where there are missing dates (transmit an alert, for the case where the training data is determined to be incomplete). BLOCK 13 includes computer control-logic code configured to send (transmit) one or more alerts to the user, for the case where this condition (in BLOCK 13) is present, after which the framework process may be stopped.

Block 15

Referring to the embodiment as depicted in FIG. 2, control is transferred from BLOCK 12 to BLOCK 15, for the case where the training data is determined to be duplicated. This condition may indicate a larger system failure and may cause (result in) failure of a time-series model. BLOCK 15 includes computer control-logic code configured to send (transmit) an alert, for the case where there is duplicate data (as determined in BLOCK 12). BLOCK 15 includes computer control-logic code configured to send (transmit) one or more alerts to the user, for the case where this condition (in BLOCK 15) is present, after which the framework process may be stopped.

Block 14 Training Model

Referring to the embodiment as depicted in FIG. 2, control is transferred from BLOCK 12 (checking for duplicates) to BLOCK 14, for the case where there are no duplicates or missing dates identified (an outcome from BLOCK 12). BLOCK 14 includes computer control-logic code configured to train a model based on a training period predetermined by the user. In the present example, six months of daily volume of data is selected by the user as the training data. It will be appreciated that any training time period may be used (selected by the user). The framework includes computer control-logic code configured to use a six-month rolling window of training data for training a model, for each week (e.g., training data from the least recent week is dropped and the most recent week is added). Control is transferred from BLOCK 14 to BLOCK 16, after the model has been trained.

Block 16

Referring to the embodiment as depicted in FIG. 2, control is transferred from BLOCK 14 to BLOCK 16. BLOCK 16 includes computer control-logic code configured to (A) generate confidence interval widths, and (B) find (identify) an appropriate confidence level. BLOCK 16 (preferably) includes computer control-logic code configured to (A) generate 50 percent to 95 percent confidence intervals in five percent increments, and (B) save the confidence intervals (that were generated) in a staging table. Control is transferred from BLOCK 16 to BLOCK 17.

Block 17

Referring to the embodiment as depicted in FIG. 2, control is transferred from BLOCK 16 to BLOCK 17. BLOCK 17 includes computer control-logic code configured to select an appropriate confidence level for a forecast, by checking against the confidence interval widths that were generated (computed). Control is transferred from BLOCK 17 to BLOCK 18.

Block 18

Referring to the embodiment as depicted in FIG. 2, control is transferred from BLOCK 17 to BLOCK 18. BLOCK 18 includes computer control-logic code configured to determine appropriateness by first finding (identifying) a distance between the 80th percentile and the 20th percentile from the volume of data over a predefined time period (such as the last two months). The distance between the 80th percentile and the 20th percentile is called the 80/20 distance (reference is made to FIG. 3 for an embodiment of the 80/20 distance). Referring back to FIG. 2, BLOCK 18 includes computer control-logic code configured to label the confidence level as APPROPRIATE for use, for the case where all of the confidence interval widths (that were generated) is smaller than the 80/20 distance. BLOCK 18 includes computer control-logic code configured to label the confidence level as NOT APPROPRIATE, for the case where any of the confidence widths (that were generated) exceeds (is greater than) the 80/20 distance. Control is transferred from BLOCK 18 to BLOCK 19, for the case where the confidence level is labeled as NOT APPROPRIATE. Control is transferred from BLOCK 18 to BLOCK 20 for the case where the confidence level is labeled as APPROPRIATE.

Figure 3:
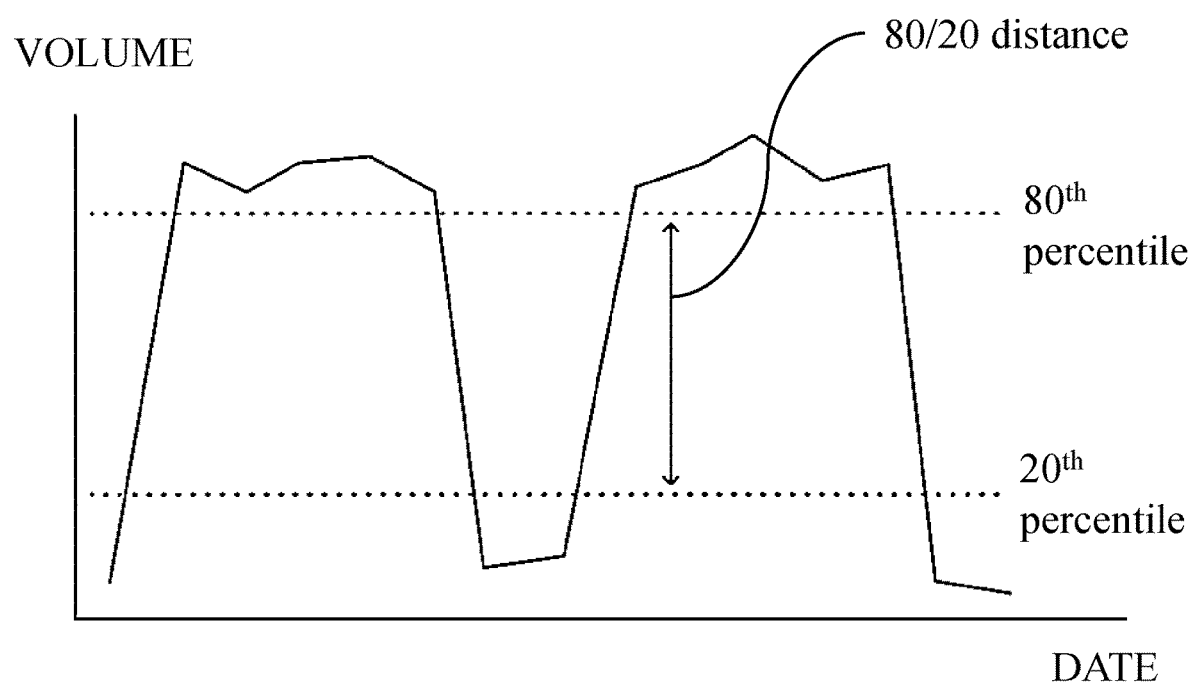
FIG. 3 (SHEET 3 of 8 SHEETS) depicts a schematic view of an 80/20 distance rule that was computed using the logic-control flow diagram of FIG. 2A, FIG. 2B, and FIG. 2C.

FIG. 3 depicts a schematic view of an 80/20 distance rule that was computed using the logic-control flow diagram of FIG. 2A, FIG. 2B, and FIG. 2C.

Referring to the embodiment as depicted in FIG. 3, the 80/20 distance (distance rule or rule) is depicted. The 80/20 distance was computed by the framework (by using the logic-control flow diagram of FIG. 2A, FIG. 2B, and FIG. 2C). The framework includes computer control-logic code configured to determine (compute) the 80/20 distance for the desired confidence (this is done, preferably, by using the two most recent months of volume of data, etc.). The 80th percentile and the 20th percentile may be used to determine the maximum distance allowed for any of the generated confidence intervals.

Figure 4:
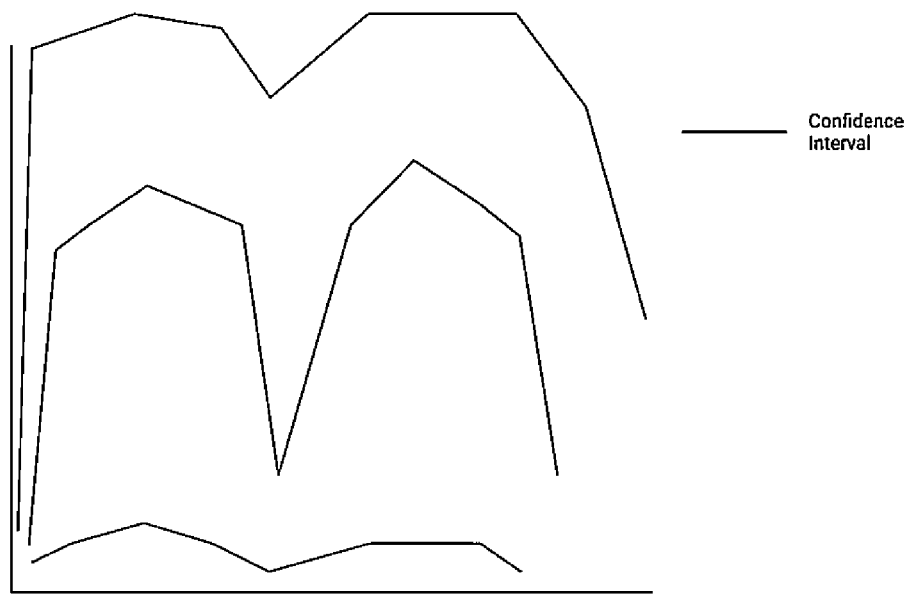
FIG. 4 (SHEET 4 of 8 SHEETS) depicts a schematic view of a confidence level to be used by the logic-control flow diagram of FIG. 2A, FIG. 2B, and FIG. 2C, in which the confidence level is too wide.

FIG. 4 depicts a schematic view of a confidence level to be used by the logic-control flow diagram of FIG. 2A, FIG. 2B, and FIG. 2C, in which the confidence level is too wide.

Referring to the embodiment as depicted in FIG. 4, there is depicted an exemplary confidence level that is too wide. For the case where a selected confidence interval is too wide, alerts may not be generated when anomalies occur. Conversely, for the case where a selected confidence interval is too narrow, too many anomaly alerts may be generated.

Figure 5:
FIG. 5 (SHEET 4 of 8 SHEETS) depicts a schematic view of a confidence level to be used by the logic-control flow diagram of FIG. 2A, FIG. 2B, and FIG. 2C, in which the confidence level is too narrow.

FIG. 5 depicts a schematic view of a confidence level to be used by the logic-control flow diagram of FIG. 2A, FIG. 2B, and FIG. 2C, in which the confidence level is too narrow.

Referring to the embodiment as depicted in FIG. 5, the confidence level is too narrow.

Block 19

Referring to the embodiment as depicted in FIG. 2, control is transferred from BLOCK 18 to BLOCK 19. BLOCK 19 includes computer control-logic code configured to (A) retrain the model, and (B) regenerate the confidence level. BLOCK 19 includes computer control-logic code configured to identify (find) an appropriate confidence level that satisfies the 80/20 distance rule over a training time window (preferably while using a training time window of six months, etc.). BLOCK 19 includes computer control-logic code configured to iteratively test using a relatively smaller time window (decrementing by one month at a time, for instance), for the case where no appropriate confidence level is found that satisfies the 80/20 distance rule over a training time window (while using a training time window of 6 months, etc.). For example, the sequence from BLOCK 14 to BLOCK 18 may be repeated until an appropriate confidence level is found (by BLOCK 19). Each iteration (from BLOCK 14 to BLOCK 18) uses the training data selected from a smaller time window than the previous iteration. Control is transferred from BLOCK 19 to BLOCK 20, for the case where an appropriate model and confidence level are identified (by BLOCK 19). Control is transferred from BLOCK 19 to BLOCK 21, for the case where an appropriate model and confidence level are not identified (by BLOCK 19).

Figure 6:
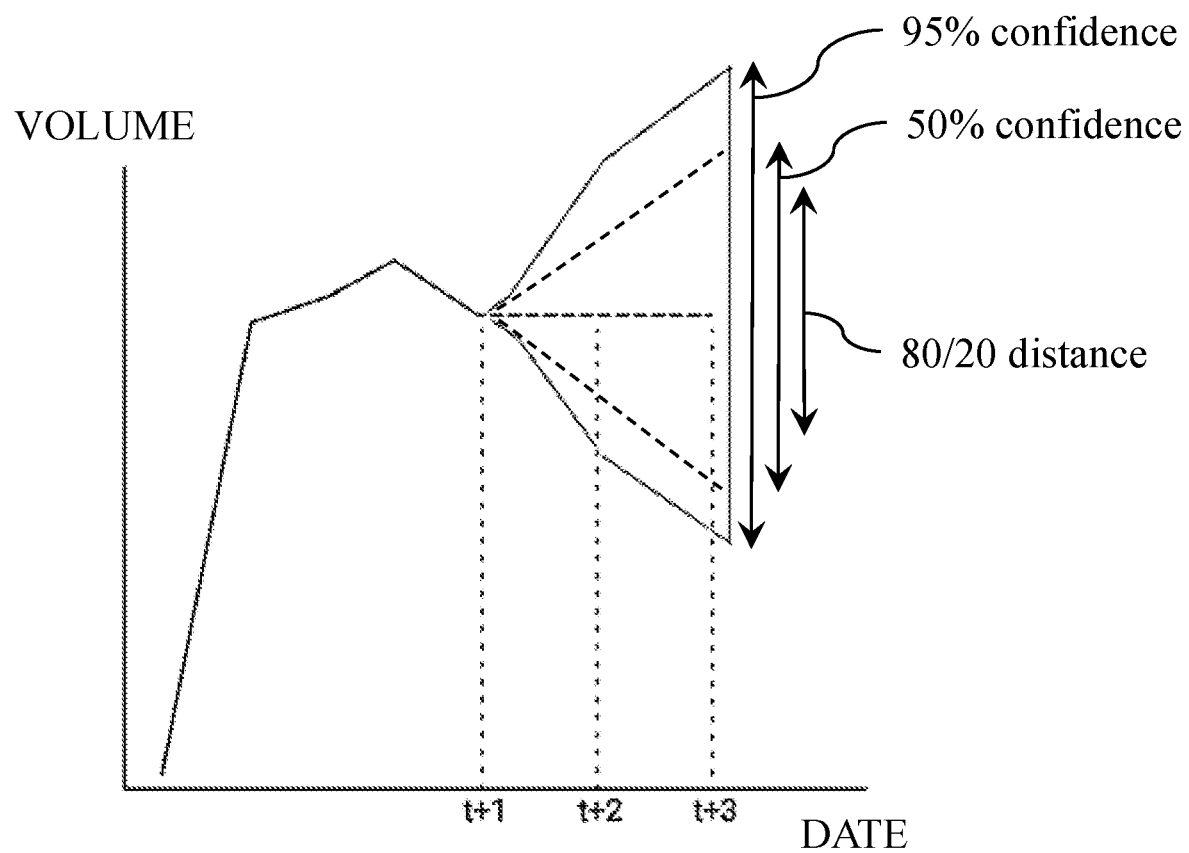
FIG. 6 (SHEET 5 of 8 SHEETS) depicts a schematic view for the case where the 80/20 distance rule is violated, in which the 80/20 distance rule is to be used by the logic-control flow diagram of FIG. 2A, FIG. 2B, and FIG. 2C.

FIG. 6 depicts a schematic view for the case where the 80/20 distance rule is violated, in which the 80/20 distance rule is to be used by the logic-control flow diagram of FIG. 2A, FIG. 2B, and FIG. 2C.

Referring to the embodiment as depicted in FIG. 6, the 80/20 distance rule is violated at date [time +3]. The framework includes computer control-logic code configured to (A) determine whether the confidence level satisfies the 80/20 distance rule (the confidence level is narrower than the 80/20 distance rule), for a given date range (such as from date [time +1] to date [time +7]), and (B) label the confidence level as APPROPRIATE (for the given date range).

Block 21

Referring to the embodiment as depicted in FIG. 2, control is transferred from BLOCK 19 to BLOCK 21, for the case where an appropriate model and confidence level are not identified (by BLOCK 19). BLOCK 21 includes computer control-logic code configured to generate (issue, transmit) an alert, for the case where no appropriate confidence level exists for the training data (such as from one month to six months, etc.). The alert is configured to indicate: (A) the process being modeled cannot be modeled with a model (such as the Auto-Regressive Integrated Moving Average model), and (B) a different approach should be used to generate an appropriate model. Once BLOCK 21 is completed, the framework process (method) ends (terminates).

Block 20

Referring to the embodiment as depicted in FIG. 2, control is transferred from BLOCK 19 to BLOCK 20, for the case where an appropriate model and confidence level are identified (by BLOCK 19). BLOCK 20 includes computer control-logic code configured to forecast values for a future time period (such as the next seven days, etc.), for the case where: (A) the original model (as processed by BLOCK 14) has an appropriate confidence level, or (B) a retrained model has an appropriate confidence level (as processed by BLOCK 19). Control is transferred from BLOCK 21 to BLOCK 7, after the values of volumes of data (to be received by the second server, known to persons skilled in the art, and not depicted) have been forecasted. Transferring control to BLOCK 7 includes computer control-logic code configured to reprocess the volume of data having the time-series data, monitor the volume of data, and detect whether there is at least one anomaly in the volume of data by determining whether an actual value falls outside of a confidence interval to be generated.

A cloud computing infrastructure may be used for implementing the framework. A data pipeline (known to persons of skill in the art, and not depicted) may be used for scheduling the framework processes. A data pipeline is a set of data processing elements connected in a series (one item after the other), where the output of one element is the input of the next one. The elements of a pipeline may be executed in parallel or in a time-sliced fashion. Some amount of buffer storage may be inserted between elements. The data pipeline may include the APACHE (TRADEMARK) AIRFLOW (TRADEMARK) data pipeline, etc., and/or any equivalent thereof. A cloud computing infrastructure (known to persons of skill in the art, and not depicted) may be used for implementing the framework and/or the data pipeline solution. The cloud computing infrastructure may include GOOGLE (TRADEMARK) CLOUD SERVICES computing infrastructure, AMAZON (TRADEMARK) WEB SERVICES computing infrastructure, MICROSOFT (TRADEMARK) AZURE computing infrastructure, etc. and/or any equivalent thereof (and/or in any combination and/or permutation thereof). Models and metadata may be stored in a staging table (known to persons skilled in the art, and not depicted), and the forecasts may be stored in a production table to, thereby, enable the use of the forecasts and anomaly alerts for any downstream framework processes, dashboards, and/or historical analysis, etc.

To scale up or scale down monitoring (with ease), there may be provided a function for each attribute (e.g., for each data attribute) to be monitored, The function is configured to create the framework processes in the control workflow (as described). For instance, only a JSON (JavaScript Object Notation) is required with the name of each attribute and location to save the respective models, model metadata, and forecasts, and this framework process will scale automatically to the number of attributes (that are assigned to the attributes). JSON is an open standard file format and data interchange format that uses human-readable text to store and transmit data objects consisting of attribute-value pairs and arrays (or other serializable values). For example, this framework process may be used to monitor the daily volume of several tables (such as fifteen tables); therefore, this framework process exists fifteen times, one for each table. The framework process is not created fifteen times (individually); this is done through a scaling function, by feeding in a JSON with the table names and destination location. This allows easier scale-up for monitoring, where this process may be used for many tables (1 to 1000 tables) with relatively minimal effort.

FIG. 7A, FIG. 7B, FIG. 7C, FIG. 7D, and FIG. 7E depict schematic views, in accordance with a second embodiment, of a logic-control flow diagram for a framework process (a framework method) for use with the training data 1 of FIG. 1.

Figure 7A:
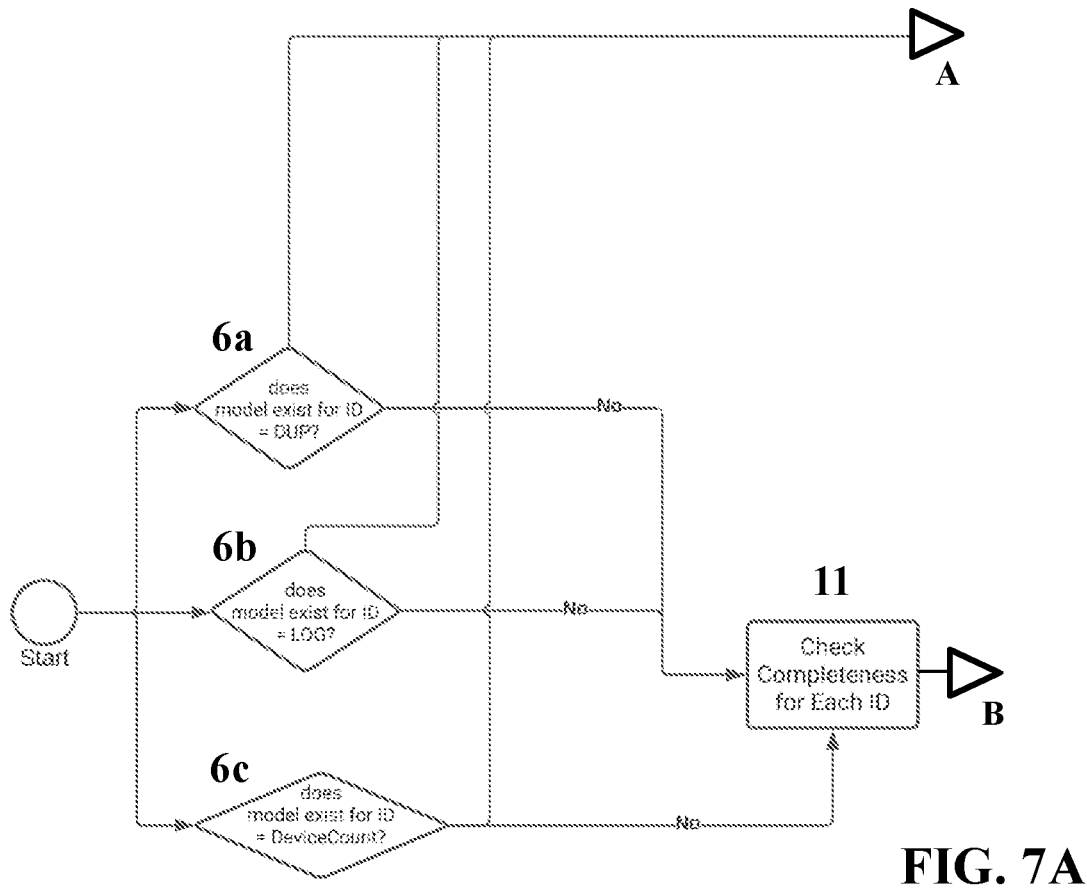
FIG. 7A, FIG. 7B, FIG. 7C, FIG. 7D, and FIG. 7E (SHEETS 6 to 8 of 8 SHEETS) depict schematic views, in accordance with a second embodiment, of a logic-control flow diagram for a framework process (a framework method) for use with the training data 1 of FIG. 1.
Figure 7B:
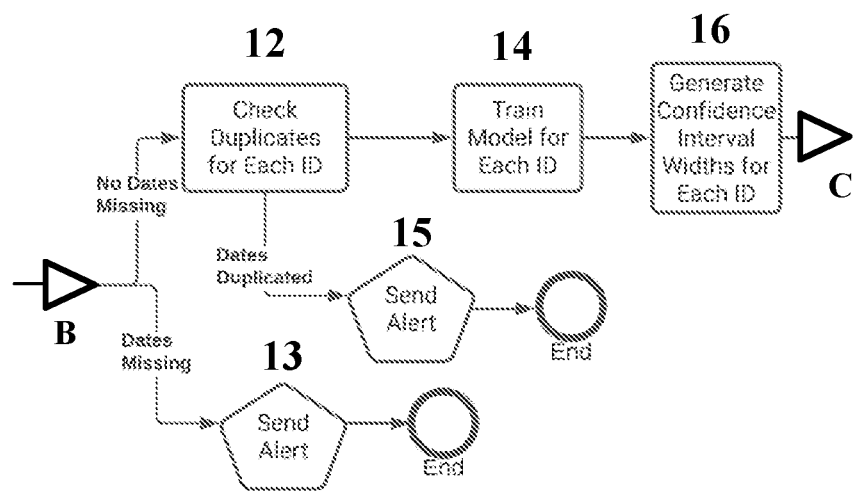
Figure 7C:
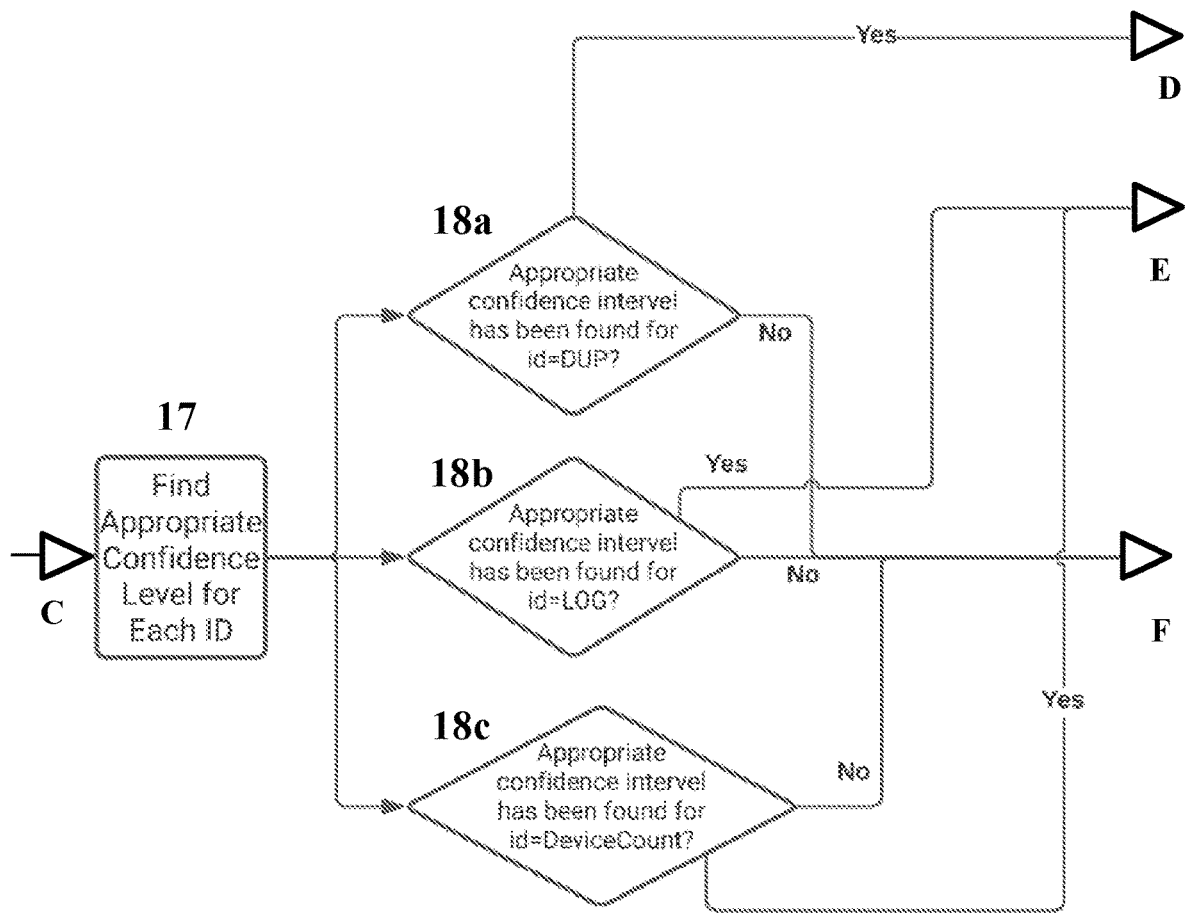
Figure 7D:
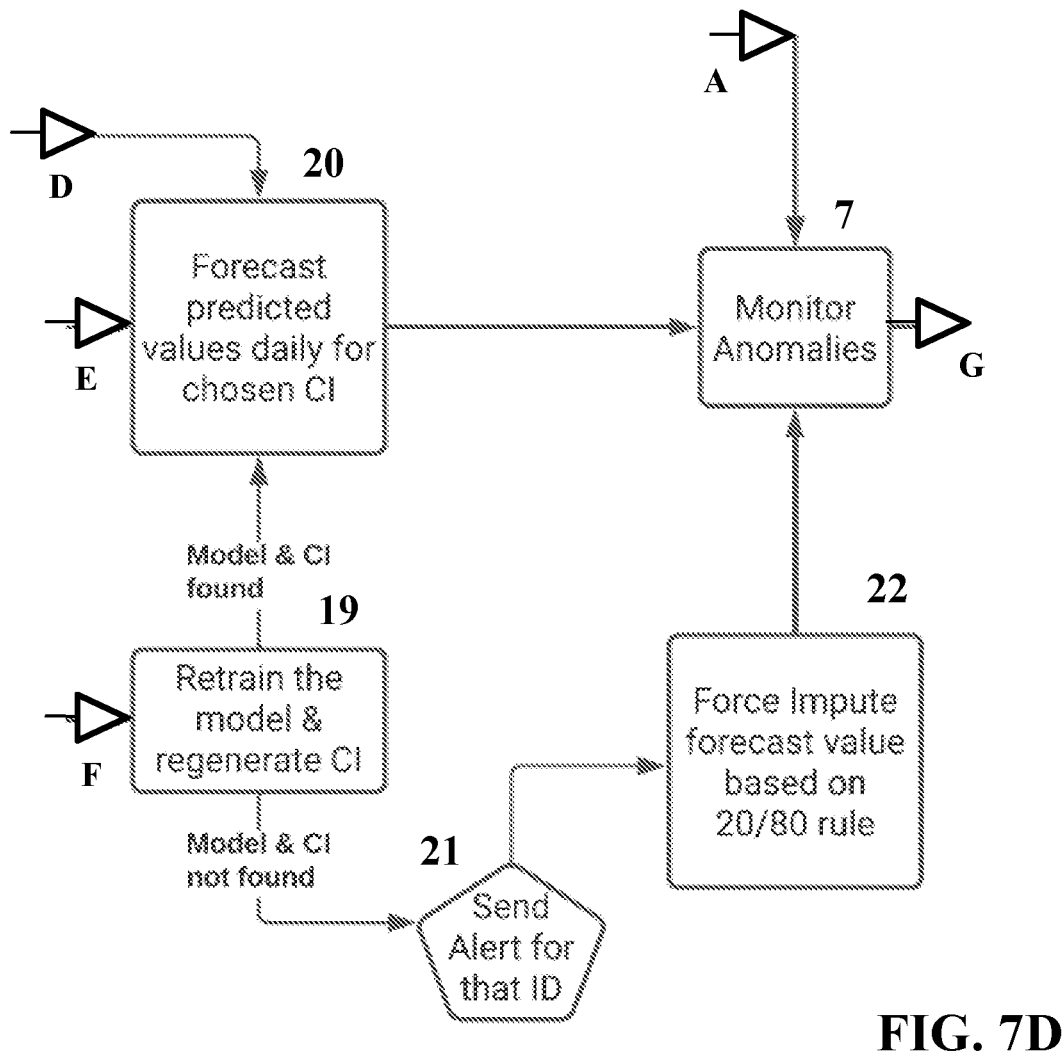
Figure 7E:
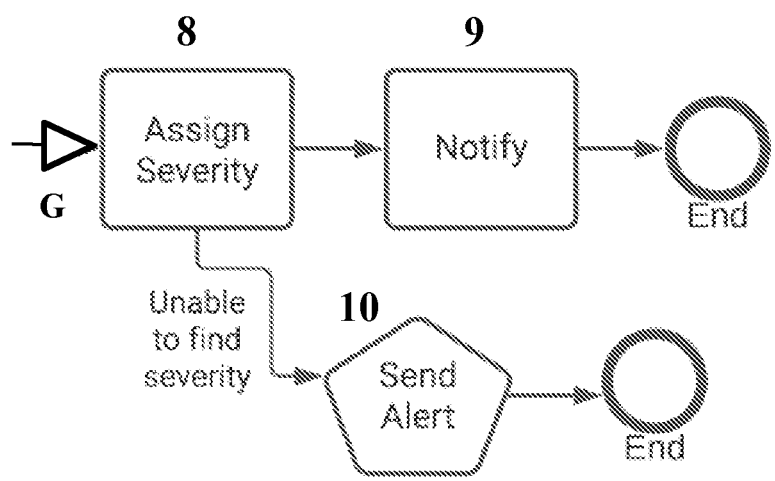

Referring to the embodiment as depicted in FIG. 7A, FIG. 7B, FIG. 7C, FIG. 7D, and FIG. 7E, BLOCK 6 of FIG. 2A is modified to include BLOCK 6a, BLOCK 6b and BLOCK 6c (as depicted in FIG. 7A). BLOCK 18 of FIG. 2C is modified to include BLOCK 18a, BLOCK 18b and BLOCK 18c (as depicted in FIG. 7C). BLOCK 22 of FIG. 7D is new. BLOCK 7, as depicted in FIG. 7D, is the same as BLOCK 7, as depicted in FIG. 2B. BLOCK 8, BLOCK 9 and BLOCK 10, as depicted in FIG. 7E, are the same as BLOCK 8, BLOCK 9 and BLOCK 10, as depicted in FIG. 2C (respectively). BLOCK 11, as depicted in FIG. 7A, is the same as BLOCK 11, as depicted in FIG. 2A. BLOCKS 12, 13, 14, 15 and 16, as depicted in FIG. 7B, are the same as BLOCKS 12, 13, 15 and 16, as depicted in FIG. 2A (respectively). BLOCK 17, as depicted in FIG. 7C, is the same as BLOCK 17, as depicted in FIG. 2B. BLOCK 19, BLOCK 20 and BLOCK 21, as depicted in FIG. 7D, are the same as BLOCK 19, BLOCK 20 and BLOCK 21, as depicted in FIG. 2B (respectively).

Set Variables

Referring to the embodiment as depicted in FIG. 7A, FIG. 7B, FIG. 7C, FIG. 7D, and FIG. 7E, to dynamically create a monitor (known to persons of skill in the art, and not depicted) for metrics that are of potential interest, a data pipeline system (known and not depicted) may require storing identifiers (IDs) for their corresponding dataset and/ or parameters as variables in its environment (such as by providing or passing a JSON file). The monitor (also called a software monitor) utilizes a collection of code fragments (either embedded in an operating system, or an application program, etc.) configured to gather performance data. The impact of the monitor may be kept to a minimum (in order that the impact on the running system being measured is minimal). A JSON file is a file that stores simple data structures and objects in the JavaScript Object Notation (JSON) format, which is a standard data interchange format, and may be used for transmitting data between a web application and a server. The JSON file may be required to run only when there is a change in the JSON file as values need to be updated in the variable dictionary of the data pipeline, such as the APACHE (TRADEMARK) AIRFLOW (TRADEMARK) data pipeline, etc.

Metric ID

Referring to the embodiment as depicted in FIG. 7A, FIG. 7B, FIG. 7C, FIG. 7D, and FIG. 7E, to simplify the workflow (the framework process), and/or avoid further manual interruption, a task is added (dynamically) to the monitor, and the task is run (operated or executed) every time the monitor is triggered. Multiple models may be needed for the same artifact to be monitored. To reduce the manual process of creating each model, there is added a METRIC ID parameterization. This arrangement allows further automation of the monitoring framework process by creating one model per metric ID per monitoring artifact. For the case where it is desired to create three monitors for a table, one table for a number of duplicates, one table for the number of rows, and one table for the number of devices (it would not be required to manually create all three models), the framework is configured to feed (provide) the three metric IDs (identifiers) into the parameterization and the three tables would be automatically created. For the case where an additional metric is added, an additional model may be created.

Block 6A, Block 6B and Block 6C

Referring to the embodiment as depicted in FIG. 7A, the framework includes computer control-logic code configured to save each model (to ensure idempotency) with the naming convention of Sunday date trained and the metric ID. This arrangement ensures that for the case where it is needed to re-run the monitors for a specific time period, the correct model may be used for the monitoring and reporting of anomalies. Idempotence is the property of certain operations, whereby the operations may be applied multiple times without changing the result beyond the initial application.

Block 6A

Referring to the embodiment as depicted in FIG. 7A, BLOCK 6a includes computer control-logic code configured to determine whether the model exists for ID=DUP (duplicate). Control is transferred from BLOCK 6a to BLOCK 7 (as depicted in FIG. 7D), for the case where it is determined that the model has been found (identified) for ID=DUP (duplicate). Control is transferred from BLOCK 6a to BLOCK 7, for the case where it is determined that the model has not been found for ID=DUP (duplicate).

Block 6B

Referring to the embodiment as depicted in FIG. 7A, Block 6B includes computer control-logic code configured to determine whether the model has been found for ID=LOG. Control is transferred from BLOCK 6B to BLOCK 7, for the case where it is determined that the model has been found for ID=LOG. Control is transferred from BLOCK 6B to BLOCK 7, for the case where it is not determined that the model has not been found for ID=LOG.

Block 6C

Referring to the embodiment as depicted in FIG. 7A, BLOCK 6C includes computer control-logic code configured to determine whether the model has been found for ID=DEVICE_COUNT. Control is transferred from BLOCK 6C to BLOCK 7, for the case where it is determined that model has been found for ID=DEVICE_COUNT. Control is transferred from BLOCK 6C to BLOCK 7, for the case where it is not determined that the model has not been found for ID=DEVICE_COUNT.

Block 18A, Block 18B and Block 18C

Referring to the embodiment as depicted in FIG. 7C, the framework includes computer control-logic code configured to retrain individual Metric IDs for the case where one of the models does not meet (satisfy) the 80/20 rule (that is, the confidence interval rule). As a result, the framework may remain automated (from end to end).

Block 18A

Referring to the embodiment as depicted in FIG. 7C, BLOCK 18a includes computer control-logic code configured to determine whether the confidence interval has been found for ID=DUP (duplicate). Control is transferred from BLOCK 18a to BLOCK 20, for the case where it is determined that the confidence interval has been found for ID=DUP (duplicate). Control is transferred from BLOCK 18a to BLOCK 19, for the case where it is determined that the confidence interval has not been found for ID=DUP (duplicate).

Block 18B

Referring to the embodiment as depicted in FIG. 7C, BLOCK 18b includes computer control-logic code configured to determine whether the confidence interval has been found for ID=LOG. Control is transferred from BLOCK 18b to BLOCK 20, for the case where it is determined that the confidence interval has been found for ID=LOG. Control is transferred from BLOCK 18b to BLOCK 19, for the case where it is not determined that the confidence interval has not been found for ID=LOG.

Block 18C

Referring to the embodiment as depicted in FIG. 7C, BLOCK 18c includes computer control-logic code configured to determine whether the confidence interval has been found for ID=DEVICE_COUNT. Control is transferred from BLOCK 18c to BLOCK 20, for the case where it is determined that the confidence interval has been found for ID=DEVICE_COUNT. Control is transferred from BLOCK 18c to BLOCK 19, for the case where it is not determined that the confidence interval has not been found for ID=DEVICE_COUNT.

Block 22

Referring to the embodiment as depicted in FIG. 7D, as an alternative to the embodiment as depicted in FIG. 2B (in which BLOCK 21 ends with the termination of the framework process), control is transferred from BLOCK 21 to BLOCK 22. BLOCK 22 includes computer control-logic code configured to force (impute, assign) a forecast value based on the 80/20 distance (distance rule). Once BLOCK 22 is completed, control is transferred from BLOCK 22 to BLOCK 7.

Figure 8:
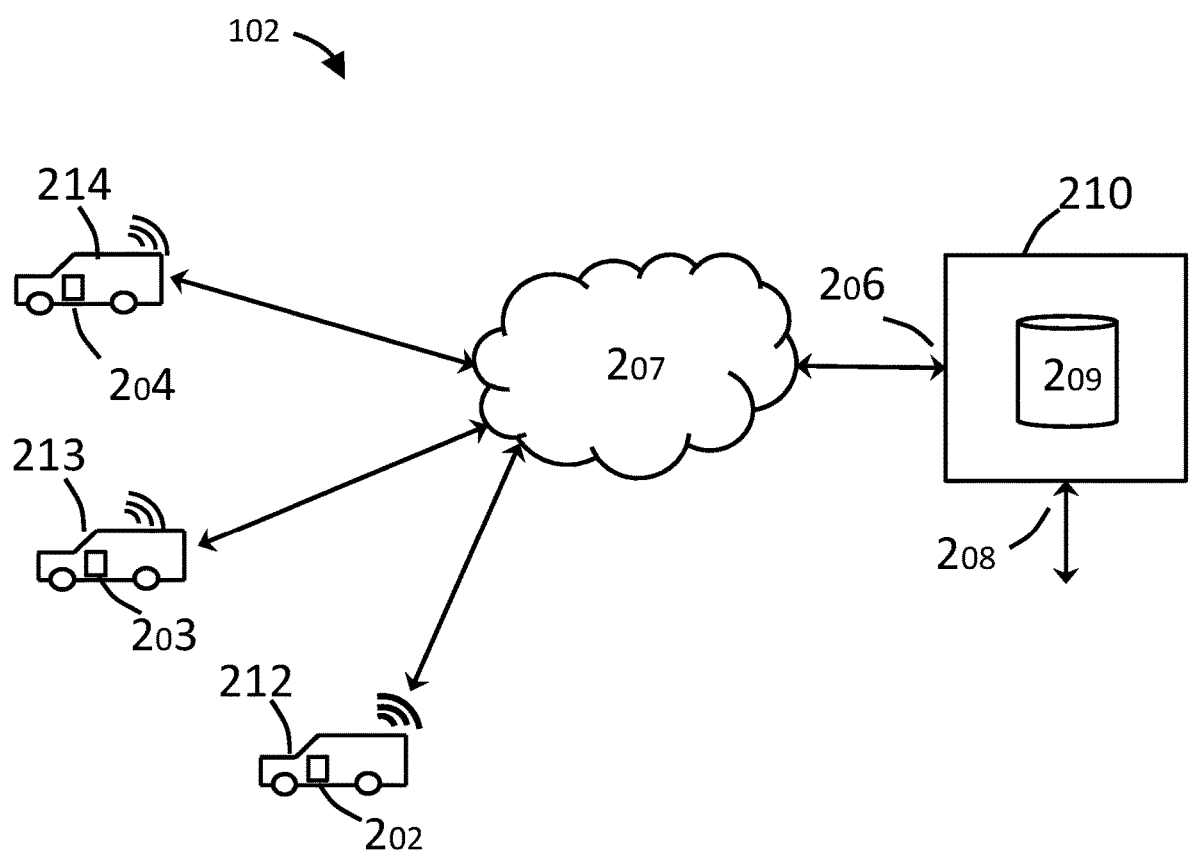
FIG. 8 depicts a schematic block diagram of an embodiment of a telematics system configured to provide data to be used for generating the training data 1 of FIG. 1.

Referring to the embodiment as depicted in FIG. 8, there is depicted a telematics system 102 configured to gather and store vehicle operation information. Telematics system 102 comprises telematics subsystem 210 (e.g., server) having a first network interface 206 and onboard monitoring devices 202, 203, and 204 communicatively coupled therewith via communication network 207.

Referring to the embodiment as depicted in FIG. 8, communication network 207 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 207 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. Communication network 207 may take other forms as well.

Referring to the embodiment as depicted in FIG. 8, telematics system 102 may comprise another network interface 208 for communicatively coupling to another communication network, such as communication network 110. Telematics subsystem 210 may comprise a plurality of servers, datastores, and other devices, configured in a centralized, distributed or other arrangement.

Referring to the embodiment as depicted in FIG. 8, there are depicted vehicles 212, 213 and 214, each thereof having aboard the onboard monitoring devices 202, 203, and 204, respectively. A vehicle may include a car, truck, recreational vehicle, heavy equipment, tractor, snowmobile, or other transportation asset. Onboard monitoring devices 202-204 may transmit raw vehicle data associated with vehicles 212-214. Raw vehicle data transmitted and collected over a period of time forms historical vehicle data which may be stored by remote subsystem 210.

Referring to the embodiment as depicted in FIG. 8, a monitoring device is associated with a particular vehicle. For example, during configuration of monitoring devices 202-204, each thereof may be assigned a unique device ID that is uniquely associated with a vehicle information number (VIN) of vehicles 212-214, respectively. This enables an instance of received raw vehicle data to be associated with a particular vehicle. As such, vehicle-specific raw vehicle data may be discernable among other raw vehicle data in the historical vehicle data.

Referring to the embodiment as depicted in FIG. 8, three monitoring devices are described in this example for explanation purposes only and embodiments are not intended to be limited to the examples described herein. In practise, a telematics system may comprise many vehicles, such as hundreds, thousands and tens of thousands or more. Thus, huge volumes of raw vehicle data may be received and stored by remote telematics subsystem 210.

Referring to the embodiment as depicted in FIG. 8, monitoring devices (in general) comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, among others. One of ordinary skill in the art will appreciate that these are but a few types of vehicle operating conditions that may be detected.

Referring to the embodiment as depicted in FIG. 8, monitoring device 202 may comprise a sensing module for determining vehicle position. For instance, the sensing module may utilize Global Positioning System (GPS) technology (e.g., GPS receiver) for determining the geographic position (Lat/Long coordinates) of vehicle 212. Alternatively, the sensing module utilizes another a global navigation satellite system (GNSS) technology, such as, GLONASS or BeiDou. Alternatively, the sensing module may further utilize another kind of technology for determining geographic position. In addition, sensing module may provide other vehicle operating information, such as speed.

Referring to the embodiment as depicted in FIG. 8, alternatively, vehicle position information may be provided according to another geographic coordinate system, such as, Universal Transverse Mercator, Military Grid Reference System, or United States National Grid.

Referring to the embodiment as depicted in FIG. 8, a vehicle may include, generally, various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Referring to the embodiment as depicted in FIG. 8, monitoring device 202 may comprise a monitoring module operable to communicate with a data/communication bus of vehicle 212. Monitoring module may communicate via a direct connection, such as, electrically coupling, with a data/communication bus of vehicle 212 via a vehicle communication port, (e.g., diagnostic port/communication bus, OBDII port). Alternatively, monitoring module may comprise a wireless communication interface for communicating with a wireless interface of the data/communication bus of vehicle 212. Optionally, a monitoring module may communicate with other external devices/systems that detect operating conditions of the vehicle.

Referring to the embodiment as depicted in FIG. 8, monitoring device 202 may be configured to wirelessly communicate with telematics subsystem 210 via a wireless communication module. In some embodiments, monitoring device 202 may directly communicate with one or more networks outside vehicle 212 to transmit data to telematics subsystem 210. A person of ordinary skill will recognize that functionality of some modules may be implemented in one or more devices and/or that functionality of some modules may be integrated into the same device.

Referring to the embodiment as depicted in FIG. 8, monitoring devices 202-204 may transmit raw vehicle data, indicative of vehicle operation information collected thereby, to telematics subsystem 210. The raw vehicle data may be transmitted at predetermined time intervals, (e.g. heartbeat), intermittently, and/or according to other predefined conditions. Raw vehicle data transmitted from monitoring devices 202-204 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

Referring to the embodiment as depicted in FIG. 8, raw vehicle data received and stored by a subsystem over a period of time forms historical vehicle data. In an exemplary implementation, historical vehicle data may be stored by telematics subsystem 210 in a database, such as database 209, as shown. A period of time may include, for example, 3 months, 6 months, 12 months, or another duration of time.

Traffic Analytics System

Figure 9A:
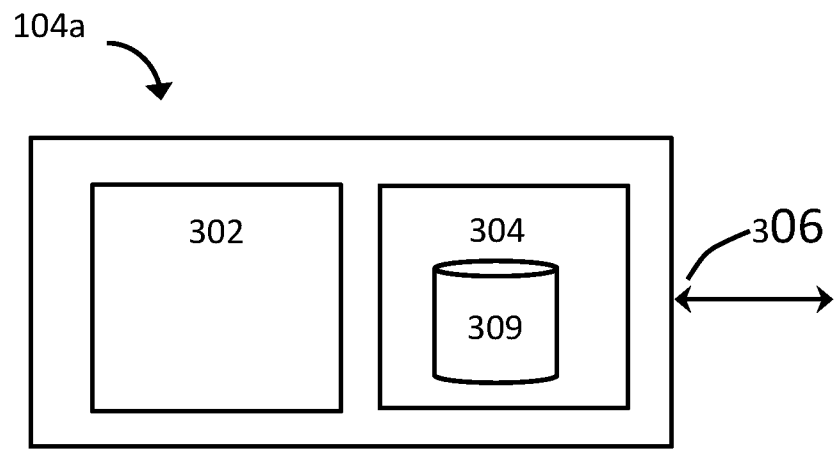
FIG. 9A depicts a schematic block diagram of an embodiment of a traffic analytics system implemented as computing platform for processing the training data 1 of FIG. 1.
Figure 9B:
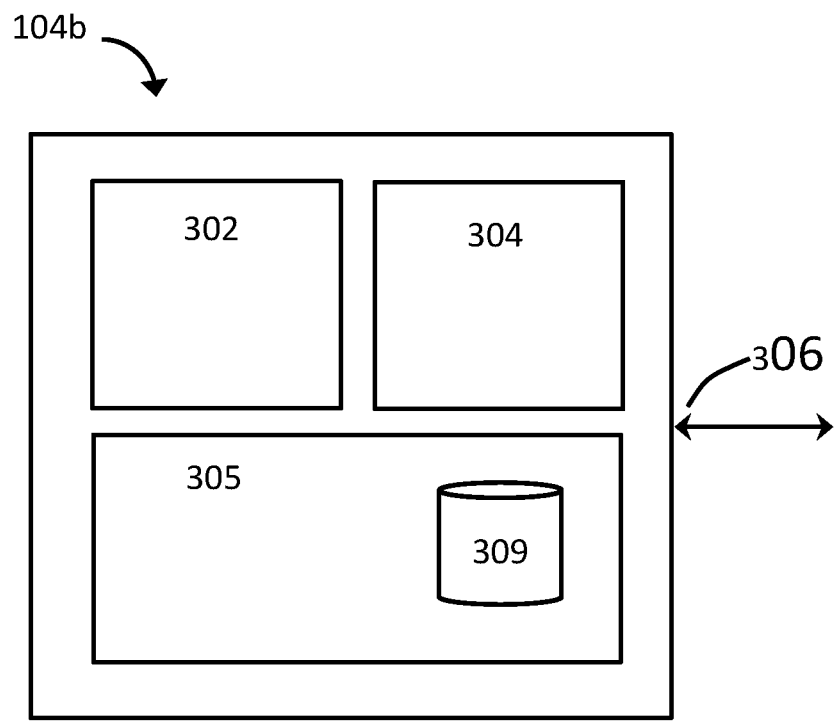
FIG. 9B depicts a schematic block diagram of an embodiment of a traffic analytics system comprising a data management system implemented as computing platform for processing the training data 1 of FIG. 1.

Referring to the embodiments as depicted in FIG. 9A and FIG. 9B, a traffic analytics systems 104 includes a first traffic analytics system 104a (as depicted in FIG. 9A) and a second traffic analytics system 104b (as depicted in FIG. 9B)

Referring to the embodiment as depicted in FIG. 9A, the traffic analytics system 104a comprises a processing resource 302, datastore 304, and network interface 306. For example, processing resource 302 and datastore 304 may be communicatively coupled by a system communication bus, a wired network, a wireless network, or other connection mechanism and arranged to carry out various operations described herein. Optionally, two or more of these components may be integrated together in whole or in part.

Referring to the embodiment as depicted in FIG. 9A, network interface 306 may be interoperable with communication network 110 and may be configured to receive data from various network components of the network configuration 100, 101 such as telematics system 102, remote system 106, data management system 108, and possibly other network components. Traffic analytics system 104a, 104b may communicate with one or more of these network components for obtaining historical vehicle data, or portions thereof. For instance, once received, datastore 304 may store subsets of raw vehicle data in a database, such as database 309.

Referring to the embodiment as depicted in FIG. 9A, the traffic analytics system 104a is configured to interoperate with data management system 108 for obtaining historical vehicle data and/or a portion thereof. For example, data management system 108 may manage and store large volumes (e.g., big data) and multiple types of data. Data management system 108 may comprise a relational database, for storing historical vehicle data, or a portion thereof, collected by one or more telematics or vehicle monitoring systems. Data management system 108 may include a web service that enables interactive analysis of large datasets stored in a remote datastore. Traffic analytics system 104a may be configured to interoperate with such a data management system for obtaining raw vehicle data from historical vehicle data stored therein and managed thereby. An example of such a data management system is a managed cloud data warehouse for performing analytics on data stored therein, such as BigQuery™, available from Google® of Mountain View, California U.S.A.

Referring to the embodiment as depicted in FIG. 9B, the second exemplary traffic analytics system 104b comprises a processing resource 302, a datastore 304, a data management system 305 and a network interface 306. For example, processing resource 302, datastore 304, and data management system 305 may be communicatively coupled by a system communication bus, a wired network, a wireless network, or other connection mechanism and arranged to carry out various operations described herein. Optionally, two or more of these components may be integrated together in whole or in part. Data management system 305 may comprise a datastore including database for storing historical vehicle data or a portion thereof. Optionally data management system 305 stores and manages large volumes (e.g., big data) and multiple types of data. For example, data management system 305 may comprise a relational database, for storing historical vehicle data collected by one or more telematics or vehicle monitoring systems, or a portion thereof. In another example, database 309 of data management system 305 stores subsets of raw vehicle data from historical vehicle data for processing by analytics system 104b. Alternatively, data management system 305 may include and/or access a web service that enables interactive analysis of large datasets stored in a remote datastore. An example of such a data management system is a managed cloud data warehouse for performing analytics on data stored therein, such as BigQuery.

Referring to the embodiment as depicted in FIG. 9B, the second traffic analytics system 104b receives and stores historical vehicle data in data management system 305 and operates on subsets of historical vehicle data in accordance with operations described herein.

Referring to the embodiment as depicted in FIG. 9B, processing resource 302 may include one or more processors and/or controllers, which may take the form of a general or a special purpose processor or controller. In exemplary implementations, processing resource 302 may be, or include, microprocessors, microcontrollers, application specific integrated circuits, digital signal processors, and/or other data processing devices. Processing resource 302 may be a single device or distributed over a network.

Referring to the embodiment as depicted in FIG. 9A, datastore 304 may be or include one or more non-transitory computer-readable storage media, such as optical, magnetic, organic, or flash memory, among other data storage devices and may take any form of computer readable storage media. Datastore 304 may be a single device or may be distributed over a network.

Referring to the embodiment as depicted in FIG. 9A, processing resource 302 may be configured to store, access, and execute computer-readable program instructions stored in datastore 304, to perform the operations of traffic analytics system 104a, 104b described herein. For instance, processing resource 302 may be configured to receive historical vehicle data and may execute a classification model for defining a vehicle way. Other functions are described below.

Referring to the embodiments as depicted in FIG. 9A and FIG. 9B, traffic analytics system 104a, 104b may be configured to access, receive, store, analyze and process raw vehicle data for defining a classification model and/or executing a classification model. For example, traffic analytics system 104a, 104b may select and process raw vehicle data of a plurality of vehicles corresponding to a known area, for determining whether the known area is likely to be a portion of a vehicle way. Other examples and corresponding operations are also possible.

Referring to the embodiments as depicted in FIG. 9A and FIG. 9B, traffic analytics system 104a, 104b may include and/or communicate with a user interface. The user interface may be located remote from traffic analytics system 104a, 104b. For instance, traffic analytics system 104a, 104b may communicate with a user interface via network interface 306. Other examples are also possible.

Referring to the embodiments as depicted in FIG. 9A and FIG. 9B, for the ease of description, traffic analytics system 104a, 104b is shown as a single system, however, it may include multiple computing systems, such as servers, storage devices, and other distributed resources, configured to perform operations/processes described herein. Operations and processes performed by traffic analytics system 104a, 104b described herein may be performed by another similarly configured and arranged system.

Referring to the embodiments as depicted in FIG. 9A and FIG. 9B, traffic analytics system 104a, 104b is configured to obtain, store and process historical vehicle data. For example, traffic analytics system 104a, 104b obtains first historical vehicle data 404 from telematics system 102 and stores it in database 309 (known and not depicted). Traffic analytics system 104a, 104b organizes first historical vehicle data 404 by vehicle, via associated device ID. For instance, datasets 412-414 of database 309 comprise raw vehicle data indicative of vehicle operation information of vehicles 212-214, respectively.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open-ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the disclosure which does not materially modify the disclosure. Similarly, unless specifically made clear from its context, numerical values should be construed to include certain tolerances that the person skilled in the art would recognize as having negligible importance as they do not materially change the operability of the disclosure. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options may be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the disclosure. The foregoing has outlined the non-limiting embodiments (examples). The description is made for particular non-limiting embodiments (examples). It is understood that the non-limiting embodiments are merely illustrative as examples.

What is claimed is:

1. A system for detecting vehicle data volume anomalies, the system comprising:
   at least one datastore operable to store vehicle data originating from a plurality of monitoring devices installed in a plurality of vehicles;
   at least one processor in communication with the at least one data store, the at least one processor operable to:
      receive, during a training period, a first collection of vehicle data from the plurality of monitoring devices;
      train a machine learning model using the first collection of vehicle data to forecast a future amount of vehicle data to be received from the plurality of monitoring devices;
      determine, based on the machine learning model, a plurality of confidence intervals for the predicted future amount of vehicle data;
      determine that no confidence interval satisfies a percentile width of the first collection of vehicle data;
      iteratively retrain the machine learning model using a subset of the first collection of vehicle data until at least one of the confidence intervals satisfies the percentile width of the first collection of vehicle data;
      select one of the confidence intervals that satisfies the percentile width of the first collection of vehicle data;
      receive, during a forecasting period, a second collection of vehicle data from the plurality of monitoring devices;
      detect a vehicle data volume anomaly in the second collection of vehicle data by determining that the amount of vehicle data in the second collection of vehicle data is outside of the selected confidence interval; and
      generate a notification indicating the detection of the vehicle data volume anomaly.

2. The system of claim 1, wherein selecting one of the confidence intervals comprises selecting a confidence interval that is narrower than the percentile width of the first collection of vehicle data.

3. The system of claim 1, wherein the machine learning model is an Auto-Regressive Integrated Moving Average (ARIMA) model.

4. The system of claim 1, wherein the percentile width is a distance between the twentieth and eightieth percentile of the amount of vehicle data in the second collection of vehicle data.

5. The system of claim 1, wherein the plurality of confidence intervals comprises five percent increments between fifty percent to night-five percent.

6. The system of claim 1, wherein the at least one processor is operable to:
   determine a severity level for the vehicle data volume anomaly based on the amount of vehicle data in the second collection of vehicle data; and
   determine a type of notification based on the severity level for the vehicle data volume anomaly.

7. The system of claim 1, wherein the at least one processor is operable to:
   determine whether the second collection of vehicle data corresponds to a holiday; and
   in response to determining that the second collection of vehicle data corresponds to a holiday, stop the notification indicating the detection of the vehicle data volume anomaly.

8. The system of claim 1, wherein the at least one processor is operable to:
   determine a high volume anomaly when the amount of vehicle data in the second collection of vehicle data is above an upper bound of the selected confidence interval; and
   determine a low volume anomaly when the amount of vehicle data in the second collection of vehicle data is below a lower bound of the selected confidence interval.

9. The system of claim 1, wherein the at least one processor is operable to:
   receive, during a second training period, a third collection of vehicle data from the plurality of monitoring devices; and
   retrain the machine learning model using the third collection of vehicle data to forecast another future amount of vehicle data to be received from the plurality of monitoring devices.

10. A method for detecting vehicle data volume anomalies, the method comprising operating at least one processor to:
   receive, during a training period, a first collection of vehicle data from a plurality of monitoring devices installed in a plurality of vehicles;
   train a machine learning model using the first collection of vehicle data to forecast a future amount of vehicle data to be received from the plurality of monitoring devices;
   determine, based on the machine learning model, a plurality of confidence intervals for the predicted future amount of vehicle data;
   determine that no confidence interval satisfies a percentile width of the first collection of vehicle data;
   iteratively retrain the machine learning model using a subset of the first collection of vehicle data until at least one of the confidence intervals satisfies the percentile width of the first collection of vehicle data;

select one of the confidence intervals that satisfies the percentile width of the first collection of vehicle data;

receive, during a forecasting period, a second collection of vehicle data from the plurality of monitoring devices;

detect a vehicle data volume anomaly in the second collection of vehicle data by determining that the amount of vehicle data in the second collection of vehicle data is outside of the selected confidence interval; and generate a notification indicating the detection of the vehicle data volume anomaly.

11. The method of claim 10, wherein selecting one of the confidence intervals comprises selecting a confidence interval that is narrower than the percentile width of the first collection of vehicle data.

12. The method of claim 10, wherein the machine learning model is an Auto-Regressive Integrated Moving Average (ARIMA) model.

13. The method of claim 10, wherein the percentile width is a distance between the twentieth and eightieth percentile of the amount of vehicle data in the second collection of vehicle data.

14. The method of claim 10, wherein the plurality of confidence intervals comprises five percent increments between fifty percent to night-five percent.

15. The method of claim 10, further comprising operating the at least one processor to:

determine a severity level for the vehicle data volume anomaly based on the amount of vehicle data in the second collection of vehicle data; and determine a type of notification based on the severity level for the vehicle data volume anomaly.

16. The method of claim 10, further comprising operating the at least one processor to:

determine whether the second collection of vehicle data corresponds to a holiday; and in response to determining that the second collection of vehicle data corresponds to a holiday, stop the notification indicating the detection of the vehicle data volume anomaly.

17. The method of claim 10, further comprising operating the at least one processor to:

determine a high volume anomaly when the amount of vehicle data in the second collection of vehicle data is above an upper bound of the selected confidence interval; and determine a low volume anomaly when the amount of vehicle data in the second collection of vehicle data is below a lower bound of the selected confidence interval.

18. The method of claim 10, further comprising operating the at least one processor to:

receive, during a second training period, a third collection of vehicle data from the plurality of monitoring devices; and retrain the machine learning model using the third collection of vehicle data to forecast another future amount of vehicle data to be received from the plurality of monitoring devices.

* * * * *